(12) United States Patent
Yu et al.

(10) Patent No.: US 10,735,334 B2
(45) Date of Patent: Aug. 4, 2020

(54) DATA SENDING METHOD, DATA RECEIVING METHOD, AND RELATED DEVICE

(71) Applicant: Huawei Technologies Co., Ltd., Shenzhen (CN)

(72) Inventors: Yinghui Yu, Beijing (CN); Baokun Shan, Beijing (CN); Xiaolei Tie, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

(21) Appl. No.: 15/934,503

(22) Filed: Mar. 23, 2018

(65) Prior Publication Data

US 2018/0219791 A1 Aug. 2, 2018

Related U.S. Application Data

(63) Continuation of application No. PCT/CN2015/090848, filed on Sep. 25, 2015.

(51) Int. Cl.
*H04L 12/801* (2013.01)
*H04L 29/06* (2006.01)
(Continued)

(52) U.S. Cl.
CPC .............. *H04L 47/34* (2013.01); *H04L 29/06* (2013.01); *H04L 69/22* (2013.01); *H04L 69/324* (2013.01);
(Continued)

(58) Field of Classification Search
None
See application file for complete search history.

(56) References Cited

U.S. PATENT DOCUMENTS

| 8,139,609 | B2 * | 3/2012 | Pani | H04L 1/1861 370/474 |
| 2008/0186946 | A1 * | 8/2008 | Marinier | H04L 47/34 370/349 |

(Continued)

FOREIGN PATENT DOCUMENTS

| CN | 101242397 A | 8/2008 |
| CN | 101657990 A | 2/2010 |

(Continued)

OTHER PUBLICATIONS

3rd Generation Partnership Project;Technical Specification Group Radio Access Network;Evolved Universal Terrestrial Radio Access (E-UTRA);Radio Link Control (RLC) protocol specification(Release 12),3GPP TS 36.322 V12.3.0, XP051023158, total 40 pages (Sep. 2015).

(Continued)

*Primary Examiner* — Xavier S Wong
(74) *Attorney, Agent, or Firm* — Leydig, Voit & Mayer, Ltd.

(57) ABSTRACT

A data sending method is provided. The method includes: receiving, by a MAC entity of a sending device, a MAC SDU sent by a PDCP entity of the sending device by using a logical channel; multiplexing, by the MAC entity of the sending device, the MAC SDU to generate a first MAC data packet; segmenting or concatenating, by the MAC entity of the sending device, the first MAC data packet to generate a second MAC data packet; adding, by the MAC entity of the sending device, a MAC header to the second MAC data packet to generate a MAC PDU; and sending, by the MAC entity of the sending device, the MAC PDU to a MAC entity of a receiving device by using a physical entity of the sending device and a physical entity of the receiving device.

18 Claims, 9 Drawing Sheets

(51) Int. Cl.
    *H04L 29/08* (2006.01)
    *H04W 76/10* (2018.01)
(52) U.S. Cl.
    CPC ......... *H04W 76/10* (2018.02); *H04L 2212/00* (2013.01)

(56) References Cited

U.S. PATENT DOCUMENTS

| | | | |
|---|---|---|---|
| 2008/0219195 | A1 | 9/2008 | Pani et al. |
| 2010/0027477 | A1 | 2/2010 | Yi et al. |
| 2010/0309792 | A1* | 12/2010 | Wang ............... H04B 7/155 370/246 |
| 2011/0188464 | A1* | 8/2011 | Shinohara ........ H04W 28/065 370/329 |
| 2012/0082096 | A1 | 4/2012 | Cave et al. |
| 2012/0176971 | A1 | 7/2012 | Pani et al. |
| 2013/0322387 | A1* | 12/2013 | Kim ................. H04W 74/002 370/329 |
| 2014/0233516 | A1* | 8/2014 | Chun ................. H04W 24/08 370/329 |
| 2015/0195850 | A1* | 7/2015 | Quan ................... H04L 1/18 370/329 |
| 2016/0037510 | A1* | 2/2016 | Park ................. H04W 28/0278 370/329 |
| 2016/0262123 | A1* | 9/2016 | Abedini ........... H04W 56/0015 |

FOREIGN PATENT DOCUMENTS

| | | |
|---|---|---|
| CN | 101809915 A | 8/2010 |
| CN | 103141051 A | 6/2013 |
| IN | 101715212 A | 5/2010 |
| WO | 2009042849 A2 | 4/2009 |

OTHER PUBLICATIONS

"IEEE Standard for Local and metropolitan area networks; Part 16: Air Interface for Broadband Wireless Access Systems", IEEE Std 802.16™-2009, XP068045637, IEEE Computer Society and the IEEE Microwave Theory and Techniques Society,total 2082 pages (May 29, 2009).

"Stop-and-wait ARQ," From Wikipedia, the free encyclopedia, XP055328385, pp. 1-2, URL:https://en.wikipedia.org/w/ndex.php?title=Stop-and-wait_ARQ&oldid=680005178, Retrieved from the Internet (Dec. 12, 2016).

* cited by examiner

DATA SENDING METHOD, DATA RECEIVING METHOD, AND RELATED DEVICE

CROSS-REFERENCE TO RELATED APPLICATIONS

This application is a continuation of International Application No. PCT/CN2015/090848, filed on Sep. 25, 2015, the disclosure of which is hereby incorporated by reference in its entirety.

TECHNICAL FIELD

Embodiments of the present invention relate to the field of wireless communications, and in particular, to a data sending method, a data receiving method, and a related device.

BACKGROUND

Mobile communication has greatly changed people's life, but people's pursuit of mobile communication of higher performance never stops. To cope with an explosive mobile data traffic growth, massive device connections, and continuous emergence of various new services and application scenarios in future, the fifth generation (5G) mobile communications system emerges. As a part of 5G, Internet of Things has a rapidly increasing market demand. A forecast shows that by the year 2022, a quantity of connections to 5G Internet of Things will reach 18 billion.

Currently, in a 3GPP (3rd Generation Partnership Project) standard, a new air interface technology is designed to bear an IoT (Internet of Things) service based on a cellular network. This type of IoT is referred to as CIoT. For example, with development of 3GPP, CIoT based on an LTE cellular network emerges. However, the LTE cellular network is mainly oriented to users of voice and a large data volume, and intends to support an application scenario in which a user moves at a high speed, and improve a throughput of a cell and user experience as much as possible. However, in contrast to features and requirements of the IoT of low rate, low mobility, low costs, and low power consumption, the LTE (Long Term Evolution) cellular network has an excessively redundant and complex protocol stack structure, and signaling interaction between protocol layers is excessively frequent. Consequently, a terminal device has a complex structure, and costs are relatively high. Therefore, a protocol architecture of the LTE cellular network needs to be optimized and improved, to meet a future CIoT service bearer requirement.

SUMMARY

Embodiments of the present invention provide a data sending method, a receiving method, and a related device, so that an LTE-based cellular network can adapt to a requirement of Internet of Things.

According to an aspect, an embodiment of this application provides a data sending method, including:

receiving, by a Media Access Control MAC entity of a sending device, a Media Access Control service data unit MAC SDU sent by a Packet Data Convergence Protocol PDCP entity of the sending device by using a logical channel;

multiplexing, by the MAC entity of the sending device, the MAC SDU to generate a first MAC data packet;

segmenting or concatenating, by the MAC entity of the sending device, the first MAC data packet to generate a second MAC data packet;

adding, by the MAC entity of the sending device, a MAC header to the second MAC data packet to generate a Media Access Control protocol data unit MAC PDU; and sending, by the MAC entity of the sending device, the MAC PDU to a MAC entity of a receiving device by using a physical entity of the sending device and a physical entity of the receiving device.

In a possible design, the adding, by the MAC entity of the sending device, a MAC header to the second MAC data packet to generate a MAC PDU includes: adding, by the MAC entity of the sending device to the second MAC data packet, a MAC header that carries a sending sequence number, to generate the MAC PDU.

In a possible design, the method further includes: receiving, by the MAC entity of the sending device, an expected receiving sequence number returned by the MAC entity of the receiving device according to the MAC PDU; determining whether the returned expected receiving sequence number is equal to a sending sequence number of a next MAC PDU; and if the returned expected receiving sequence number is equal to the sending sequence number of the next MAC PDU, which indicates that the MAC PDU is correctly transmitted, sending, by the MAC entity of the sending device, the next MAC PDU to the MAC entity of the receiving device; or if the returned expected receiving sequence number is not equal to the sending sequence number of the next MAC PDU, which indicates that the MAC PDU is incorrectly transmitted, retransmitting, by the MAC entity of the sending device, the MAC PDU.

In a possible design, the retransmitting, by the MAC entity of the sending device, the MAC PDU includes: extracting, by the MAC entity of the sending device, the MAC PDU from a buffer, and rescheduling a transmission resource for the MAC PDU; and if the rescheduled transmission resource meets a condition of transmitting the MAC PDU at a time, retransmitting the MAC PDU to the MAC entity of the receiving device; or if the rescheduled transmission resource does not meet a condition of transmitting the MAC PDU at a time, re-segmenting the MAC PDU before retransmission.

In a possible design, the method further includes: if the MAC entity of the sending device does not receive, within preset duration, an expected receiving sequence number returned by the MAC entity of the receiving device according to the MAC PDU, entering, by the MAC entity of the sending device, a sleep state; and when preset sleep duration expires, re-establishing, by the MAC entity of the sending device, a connection to the MAC entity of the receiving device.

In a possible design, initial values of the sending sequence number and the expected receiving sequence number are equal, and both quantities of bits are 1.

In a possible design, before the receiving, by a MAC entity of a sending device, a MAC SDU sent by a PDCP entity of the sending device by using a logical channel, the method further includes: obtaining a priority of the logical channel, and allocating a transmission resource to the MAC SDU according to the priority of the logical channel.

According to another aspect, an embodiment of this application provides a data receiving method, including:

receiving, by a MAC entity of a receiving device by using a physical entity of a sending device and a physical entity of the receiving device, a MAC PDU received by a MAC entity of the sending device; removing, by the MAC entity of the receiving device, a MAC header from the MAC PDU, and reassembling the MAC PDU to generate a third MAC data packet; demultiplexing, by the MAC entity of the receiving device, the third MAC data packet to generate a MAC SDU; and submitting, by the MAC entity of the receiving device, the MAC SDU to a PDCP entity of the receiving device by using a logical channel.

In a possible design, before the removing, by the MAC entity of the receiving device, a MAC header from the MAC PDU, and reassembling the MAC PDU to generate a first MAC data packet, the method further includes: decoding, by the MAC entity of the receiving device, the MAC PDU; if decoding succeeds, continuing to determine whether a current expected receiving sequence number is equal to a sending sequence number of the MAC PDU; and if the current expected receiving sequence number is equal to the sending sequence number of the MAC PDU, which indicates that the MAC PDU is not a repeated data packet, returning an expected receiving sequence number obtained by increasing the current expected receiving sequence number by 1 to the MAC entity of the sending device.

In another possible design, the method further includes: if the current expected receiving sequence number is not equal to the sending sequence number of the MAC PDU, and when compared with a stored sending sequence number that is received last time, the sending sequence number of the MAC PDU is not flipped but is expected to be flipped, which indicates that the MAC PDU is a repeated data packet, keeping the current receiving sequence number unchanged, and returning the current receiving sequence number to the MAC entity of the sending device; or if the current expected receiving sequence number is not equal to the sending sequence number of the MAC PDU, and when compared with a stored sending sequence number that is received last time, the sending sequence number of the MAC PDU is flipped but is not expected to be flipped, which indicates that a MAC PDU is lost, keeping the current receiving sequence number unchanged, and returning the current receiving sequence number to the MAC entity of the sending device; or if decoding fails, or a data packet sent by the MAC entity of the sending device is not received within preset duration, keeping the current expected receiving sequence number unchanged, and returning the current expected receiving sequence number to the MAC entity of the sending device.

In a possible design, initial values of the sending sequence number and the expected receiving sequence number are equal, and both quantities of bits are 1.

According to another aspect, an embodiment of this application provides a data sending method, including: receiving, by a radio link control RLC entity of a sending device, a radio link control service data unit RLC SDU sent by a Packet Data Convergence Protocol PDCP entity of the sending device, where a transmission mode of the RLC entity of the sending device is a transparent transmission mode and an unacknowledged mode; segmenting or concatenating, by the RLC entity of the sending device, the RLC SDU, and adding an RLC header to generate a radio link control protocol data unit RLC PDU; sending, by the RLC entity of the sending device, the RLC PDU to a Media Access Control MAC entity of the sending device by using a logical channel; receiving, by the MAC entity of the sending device, a Media Access Control service data unit MAC SDU by using the logical channel; obtaining, by the MAC entity of the sending device, a priority of the logical channel, and allocating a transmission resource to the MAC SDU according to the priority of the logical channel; multiplexing, by the MAC entity of the sending device, the MAC SDU, and adding a MAC header to generate a Media Access Control protocol data unit MAC PDU; and sending, by the MAC entity of the sending device, the MAC PDU to a MAC entity of a receiving device by using a physical entity of the sending device and a physical entity of the receiving device.

In a possible design, the segmenting or concatenating, by the RLC entity of the sending device, the RLC SDU, and adding an RLC header to generate an RLC PDU includes: segmenting or concatenating, by the RLC entity of the sending device, the RLC SDU, and adding an RLC header that carries a first sending sequence number to generate the RLC PDU.

In a possible design, the method further includes: if the MAC entity of the sending device receives an ACK returned by the MAC entity of the receiving device according to the MAC PDU, sending a next MAC PDU to the MAC entity of the sending device; or if the MAC entity of the sending device receives a NACK returned by the MAC entity of the receiving device according to the MAC PDU, retransmitting the MAC PDU to the MAC entity of the sending device.

In a possible design, the retransmitting the MAC PDU to the MAC entity of the sending device includes: rescheduling a transmission resource for the MAC PDU; and if the rescheduled transmission resource meets a condition of transmitting the MAC PDU at a time, retransmitting the MAC PDU to the MAC entity of the receiving device; or if the rescheduled transmission resource does not meet a condition of transmitting the MAC PDU at a time, instructing the RLC entity of the sending device to extract the RLC PDU corresponding to the MAC PDU from a buffer, and re-segmenting the RLC PDU; and generating, by the MAC entity of the sending device, a plurality of corresponding MAC PDUs according to the re-segmented RLC PDU, and sequentially retransmitting the plurality of MAC PDUs.

In a possible design, the multiplexing, by the MAC entity of the sending device, the MAC SDU, and adding a MAC header to generate a MAC PDU includes: multiplexing, by the MAC entity of the sending device, the MAC SDU, and adding a MAC header that carries a second sending sequence number to generate the MAC PDU.

In a possible design, the method further includes: receiving, by the MAC entity of the sending device, a second expected receiving sequence number returned by the MAC entity of the receiving device according to the MAC PDU; determining whether the second expected receiving sequence number is equal to a second sending sequence number of a next MAC PDU; and if the second expected receiving sequence number is equal to the second sending sequence number of the next MAC PDU, which indicates that the MAC PDU is correctly transmitted, sending, by the MAC entity of the sending device, the next MAC PDU to the MAC entity of the receiving device; or if the second expected receiving sequence number is not equal to the second sending sequence number of the next MAC PDU, which indicates that the MAC PDU is incorrectly transmitted, retransmitting, by the MAC entity of the sending device, the MAC PDU.

In a possible design, quantities of bits of the second sending sequence number and the second expected receiving sequence number are 1, and initial values are equal.

According to an aspect, an embodiment of this application provides a data receiving method, including:

removing, by a MAC entity of a receiving device, a MAC header from a MAC PDU sent by a MAC entity of a sending device to generate a first MAC data packet; demultiplexing, by the MAC entity of the receiving device, the first MAC data packet to generate a MAC SDU; submitting, by the MAC entity of the receiving device, the MAC SDU to an RLC entity of the receiving device by using a logical channel; receiving, by the RLC entity of the receiving device, an RLC PDU by using the logical channel; reassembling, by the RLC entity of the receiving device, the RCL PDU, and removing an RLC header to generate an RLC SDU; submitting, by the RLC entity of the receiving device, the RLC SDU to a PDCP entity of the receiving device; and submitting, by the PDCP entity of the receiving device, a received PDCP PDU to an RRC entity of the receiving device after removing a PDCP header from the received PDCP PDU, and skipping performing a re-ordering function.

In a possible design, before the removing, by a MAC entity of a receiving device, a MAC header from a MAC PDU sent by a MAC entity of a sending device to generate a first MAC data packet, the method further includes: decoding, by the MAC entity of the receiving device, the MAC PDU; and if decoding is correct, removing, by the MAC entity of the receiving device, the MAC header from the MAC PDU sent by the MAC entity of the sending device to generate the first MAC data packet; and after the submitting, by the MAC entity of the receiving device, the MAC SDU to an RLC entity of the receiving device by using a logical channel, the method further includes: determining, by the RLC entity of the receiving device, whether a current first expected receiving sequence number is equal to a first sending sequence number of the RLC PDU; and if the current first expected receiving sequence number is equal to the first sending sequence number of the RLC PDU, which indicates that the RLC PDU is not a repeated data packet, increasing the current first expected receiving sequence number by 1.

In a possible design, the method further includes: if the RLC entity of the receiving device determines that the current first expected receiving sequence number is not equal to the first sending sequence number of the RLC PDU, which indicates that the RLC PDU is a repeated data packet, discarding the RLC PDU, and keeping the current first expected receiving sequence number unchanged; or if the RLC entity of the receiving device determines that the current first expected receiving sequence number is less than the first sending sequence number of the RLC PDU, which indicates that an RLC PDU is lost, instructing, by the RLC entity of the receiving device, an RCL entity of the sending device to retransmit the lost RLC PDU.

In a possible design, before the demultiplexing, by a MAC entity of a receiving device, a MAC PDU sent by a MAC entity of a sending device to generate a first MAC data packet, the method further includes: decoding, by the MAC entity of the receiving device, the MAC PDU; if decoding succeeds, continuing to determine whether the MAC PDU is a repeated data packet; and if the MAC PDU is not a repeated data packet, demultiplexing, by the MAC entity of the receiving device, the MAC PDU sent by the MAC entity of the sending device to generate the first MAC data packet.

In a possible design, the method further includes: if the MAC PDU is a repeated data packet, discarding the MAC PDU; or if a feedback message that is sent last time is a NACK, and a new data indicator NDI is flipped, or an NDI indicates a newly transmitted data packet, indicating that a MAC PDU is lost; or if a feedback message that is sent last time is a NACK, and an NDI is not flipped, or an NDI indicates retransmitted data, indicating that the MAC PDU is a retransmitted data packet.

In a possible design, the determining whether the MAC PDU is a repeated data packet includes: if a feedback message that is sent last time is an ACK, and an NDI is flipped, or an NDI indicates a newly transmitted data packet, indicating that the MAC PDU is not a repeated data packet; or if a feedback message that is sent last time is an ACK, and an NDI is not flipped, or an NDI indicates retransmitted data, indicating that the MAC PDU is a repeated data packet.

In a possible design, before the demultiplexing, by a MAC entity of a receiving device, a MAC PDU sent by a MAC entity of a sending device to generate a first MAC data packet, the method further includes: decoding, by the MAC entity of the receiving device, the MAC PDU; if decoding succeeds, obtaining, by the MAC entity of the receiving device, a second sending sequence number of the MAC PDU; determining, by the MAC entity of the receiving device, whether a current second expected receiving sequence number is equal to the second sending sequence number of the MAC PDU; and if the current second expected receiving sequence number is equal to the second sending sequence number of the MAC PDU, which indicates that the MAC PDU is not a repeated data packet, keeping the current second expected receiving sequence number unchanged, and returning the current second expected receiving sequence number to the MAC entity of the sending device.

In a possible design, the method further includes: if the MAC entity of the receiving device determines that the current second expected receiving sequence number is not equal to the second sending sequence number of the MAC PDU, which indicates that the MAC PDU is a repeated data packet, returning an expected receiving sequence number obtained by increasing the current second expected receiving sequence number by 1 to the MAC entity of the sending device; or if decoding fails, or a data packet returned by the MAC entity of the sending device is not received within preset duration, keeping, by the MAC entity of the receiving device, the current receiving sequence number unchanged, and returning the current second expected receiving sequence number to the MAC entity of the sending device.

According to an aspect, an embodiment of this application provides a sending device, where the sending device includes a MAC entity, and the MAC entity of the sending device includes: a first receiving module, configured to receive a MAC SDU sent by a PDCP entity of the sending device by using a logical channel; a multiplexing module, configured to multiplex the MAC SDU received by the first receiving module to generate a first MAC data packet; a segmentation or concatenation module, configured to segment or concatenate the first MAC data packet generated by the multiplexing module to generate a second MAC data packet; a generation module, configured to add a MAC header to the second MAC data packet generated by the segmentation or concatenation module to generate a MAC PDU; and a first sending module, configured to send the MAC PDU generated by the generation module to a MAC entity of a receiving device by using a physical entity of the sending device and a physical entity of the receiving device.

In a possible design, the generation module is configured to add, to the second MAC data packet generated by the segmentation or concatenation module, a MAC header that carries a sending sequence number, to generate the MAC PDU.

In a possible design, the MAC entity of the sending device further includes: a second receiving module, configured to receive an expected receiving sequence number returned by the MAC entity of the receiving device according to the MAC PDU; a determining module, configured to determine whether the expected receiving sequence number received by the second receiving module is equal to a sending sequence number of a next MAC PDU; and a second sending module, configured to: if a determining result of the determining module is that the expected receiving sequence number is equal to the sending sequence number of the next MAC PDU, which indicates that the MAC PDU is correctly transmitted, send the next MAC PDU to the MAC entity of the receiving device; or a retransmission module, configured to: if a determining result of the determining module is that the expected receiving sequence number is not equal to the sending sequence number of the next MAC PDU, which indicates that the MAC PDU is incorrectly transmitted, retransmit the MAC PDU.

In a possible design, the retransmission module is configured to: extract the MAC PDU from a buffer, and reschedule a transmission resource for the MAC PDU; and if the rescheduled transmission resource meets a condition of transmitting the MAC PDU at a time, retransmit the MAC PDU to the MAC entity of the receiving device; or if the rescheduled transmission resource does not meet a condition of transmitting the MAC PDU at a time, re-segment the MAC PDU before retransmission.

In a possible design, the MAC entity of the sending device further includes: a sleep module, configured to: if an expected receiving sequence number returned by the MAC entity of the receiving device according to the MAC PDU is not received within preset duration, enable the MAC entity of the sending device to enter a sleep state; and when preset sleep duration expires, re-establish a connection to the MAC entity of the receiving device.

In a possible design, initial values of the sending sequence number and the expected receiving sequence number are equal, and both quantities of bits are 1.

In a possible design, the MAC entity of the sending device further includes: a scheduling module, configured to: obtain a priority of the logical channel, and allocate a transmission resource to the MAC SDU according to the priority of the logical channel.

According to another aspect, an embodiment of this application provides a receiving device, where the receiving device includes a MAC entity, and the MAC entity of the receiving device includes: a receiving module, configured to receive, by using a physical entity of a sending device and a physical entity of the receiving device, a MAC PDU sent by a MAC entity of the sending device; a reassembly module, configured to: remove a MAC header from the MAC PDU sent by the receiving module, and reassemble the MAC PDU to generate a third MAC data packet; a demultiplexing module, configured to demultiplex the third MAC data packet generated by the reassembly module to generate a MAC SDU; and a submission module, configured to submit the MAC SDU generated by the demultiplexing module to a PDCP entity of the receiving device by using a logical channel.

In a possible design, the MAC entity of the receiving device further includes: a decoding module, configured to decode the MAC PDU; a determining module, configured to: if decoding performed by the decoding module succeeds, continue to determine whether a current expected receiving sequence number is equal to a sending sequence number of the MAC PDU; and a first returning module, configured to: if a determining result of the determining module is that the current expected receiving sequence number is equal to the sending sequence number of the MAC PDU, which indicates that the MAC PDU is not a repeated data packet, return an expected receiving sequence number obtained by increasing the current expected receiving sequence number by 1 to the MAC entity of the sending device.

In a possible design, the MAC entity of the receiving device further includes: a second returning module, configured to: if a determining result of the determining module is that the current expected receiving sequence number is not equal to the sending sequence number of the MAC PDU, and when compared with a stored sending sequence number that is received last time, the sending sequence number of the MAC PDU is not flipped but is expected to be flipped, which indicates that the MAC PDU is a repeated data packet, keep the current receiving sequence number unchanged, and return the current receiving sequence number to the MAC entity of the sending device; or a third returning module, configured to: if a determining result of the determining module is that the current expected receiving sequence number is not equal to the sending sequence number of the MAC PDU, and when compared with a stored sending sequence number that is received last time, the sending sequence number of the MAC PDU is flipped but is not expected to be flipped, which indicates that a MAC PDU is lost, keep the current receiving sequence number unchanged, and return the current receiving sequence number to the MAC entity of the sending device; or a fourth returning module, configured to: if decoding fails, or a data packet sent by the MAC entity of the sending device is not received within preset duration, keep the current expected receiving sequence number unchanged, and return the current expected receiving sequence number to the MAC entity of the sending device.

In a possible design, initial values of the sending sequence number and the expected receiving sequence number are equal, and both quantities of bits are 1.

According to another aspect, this application provides a sending device, including: an RLC entity and a MAC entity, where a transmission mode of the RLC entity of the sending device is a transparent transmission mode and an unacknowledged mode; the RLC entity of the sending device is configured to: receive an RLC SDU sent by a PDCP entity of the sending device, where the transmission mode of the RLC entity of the sending device is the transparent transmission mode and the unacknowledged mode; segment or concatenate the RLC SDU, and add an RLC header to generate an RLC PDU; and send the RLC PDU to the MAC entity of the sending device by using a logical channel; and the MAC entity of the sending device is configured to: receive, by using the logical channel, a MAC SDU sent by the RLC entity of the sending device; obtain a priority of the logical channel, and allocate a transmission resource to the MAC SDU according to the priority of the logical channel; multiplex the MAC SDU, and add a MAC header to generate a MAC PDU; and send the MAC PDU to a MAC entity of a receiving device by using a physical entity of the sending device and a physical entity of the receiving device.

In a possible design, that the RLC entity of the sending device segments or concatenates the RLC SDU, and adds an RLC header to generate an RLC PDU includes: segmenting or concatenating the RLC SDU, and adding an RLC header that carries a first sending sequence number to generate the RLC PDU; and the MAC entity of the sending device is further configured to: if the MAC entity of the sending device receives an ACK returned by the MAC entity of the receiving device according to the MAC PDU, send a next MAC PDU to the MAC entity of the sending device; or if the MAC entity of the sending device receives a NACK returned by the MAC entity of the receiving device according to the MAC PDU, retransmit the MAC PDU to the MAC entity of the sending device.

In a possible design, that the MAC entity of the sending device retransmits the MAC PDU to the MAC entity of the sending device includes: rescheduling a transmission resource for the MAC PDU; and if the rescheduled transmission resource meets a condition of transmitting the MAC PDU at a time, retransmitting the MAC PDU to the MAC entity of the receiving device; or if the rescheduled transmission resource does not meet a condition of transmitting the MAC PDU at a time, instructing the RLC entity of the sending device to extract the RLC PDU corresponding to the MAC PDU from a buffer, and re-segmenting the RLC PDU; and generating a plurality of corresponding MAC PDUs according to the re-segmented RLC PDU, and sequentially retransmitting the plurality of MAC PDUs.

In a possible design, that the MAC entity of the sending device multiplexes the MAC SDU, and adds a MAC header to generate a MAC PDU includes: multiplexing the MAC SDU, and adding a MAC header that carries a second sending sequence number to generate the MAC PDU; and the MAC entity of the sending device is further configured to: receive a second expected receiving sequence number returned by the MAC entity of the receiving device according to the MAC PDU; determine whether the second expected receiving sequence number is equal to a second sending sequence number of a next MAC PDU; and if the second expected receiving sequence number is equal to the sending sequence number of the next MAC PDU, which indicates that the MAC PDU is correctly transmitted, send the next MAC PDU to the MAC entity of the receiving device; or if the second expected receiving sequence number is not equal to the sending sequence number of the next MAC PDU, which indicates that the MAC PDU is incorrectly transmitted, retransmit the MAC PDU.

In a possible design, quantities of bits of the second sending sequence number and the second expected receiving sequence number are 1, and initial values are equal.

According to another aspect, an embodiment of this application provides a receiving device, including: a MAC entity, an RLC entity, and a PDCP entity, where the MAC entity of the receiving device is configured to: remove a MAC header from a MAC PDU sent by a MAC entity of a sending device to generate a first MAC data packet; demultiplex the first MAC data packet to generate a MAC SDU; and submit the MAC SDU to the RLC entity of the receiving device by using a logical channel; the RLC entity of the receiving device is configured to: receive, by using the logical channel, an RLC PDU sent by the MAC entity of the receiving device; reassemble the RCL PDU, and remove an RLC header to generate an RLC SDU; and submit the RLC SDU to the PDCP entity of the receiving device; and the PDCP entity of the receiving device is configured to: submit a received PDCP PDU to an RRC entity of the receiving device after removing a PDCP header from the received PDCP PDU, and skip performing a re-ordering function.

In a possible design, before removing the MAC header from the MAC PDU sent by the MAC entity of the sending device to generate the first MAC data packet, the MAC entity of the receiving device is further configured to: decode the MAC PDU; if decoding is correct, demultiplex the MAC PDU sent by the MAC entity of the sending device to generate the first MAC data packet; and after submitting the MAC SDU to the RLC entity of the receiving device by using the logical channel, the RLC entity of the receiving device is further configured to: determine whether a current first expected receiving sequence number is equal to a first sending sequence number of the RLC PDU; and if the current first expected receiving sequence number is equal to the first sending sequence number of the RLC PDU, which indicates that the RLC PDU is not a repeated data packet, increase the current first expected receiving sequence number by 1.

In a possible design, the RLC entity of the receiving device is further configured to: if determining that the current first expected receiving sequence number is not equal to the first sending sequence number of the RLC PDU, which indicates that the RLC PDU is a repeated data packet, discard the RLC PDU, and keep the current first expected receiving sequence number unchanged; or if determining that the current first expected receiving sequence number is less than the first sending sequence number of the RLC PDU, which indicates that an RLC PDU is lost, instruct an RCL entity of the sending device to retransmit the lost RLC PDU.

In a possible design, before demultiplexing the MAC PDU sent by the MAC entity of the sending device to generate the first MAC data packet, the MAC entity of the receiving device is further configured to: decode the MAC PDU; if decoding succeeds, continue to determine whether the MAC PDU is a repeated data packet; and if the MAC PDU is not a repeated data packet, demultiplex the MAC PDU sent by the MAC entity of the sending device to generate the first MAC data packet.

In a possible design, the MAC entity of the receiving device is further configured to: if the MAC PDU is a repeated data packet, discard the MAC PDU; or if a feedback message that is sent last time is a NACK, and an NDI is flipped, or an NDI indicates a newly transmitted data packet, indicate that a MAC PDU is lost; or if a feedback message that is sent last time is a NACK, and an NDI is not flipped, or an NDI indicates retransmitted data, indicate that the MAC PDU is a retransmitted data packet.

In a possible design, that the receiver determines whether the MAC PDU is a repeated data packet includes: if a feedback message that is sent last time is an ACK, and an NDI is flipped, or an NDI indicates a newly transmitted data packet, indicating that the MAC PDU is not a repeated data packet; or if a feedback message that is sent last time is an ACK, and an NDI is not flipped, or an NDI indicates retransmitted data, indicating that the MAC PDU is a repeated data packet.

In a possible design, before demultiplexing the MAC PDU sent by the MAC entity of the sending device to generate the first MAC data packet, the MAC entity of the receiving device is further configured to: decode the MAC PDU; if decoding succeeds, obtain a second sending sequence number of the MAC PDU; determine whether a current second expected receiving sequence number is equal to the second sending sequence number of the MAC PDU; and if the current second expected receiving sequence number is equal to the second sending sequence number of the MAC PDU, which indicates that the MAC PDU is not a repeated data packet, keep the current second expected receiving sequence number unchanged, and return the current second expected receiving sequence number to the MAC entity of the sending device.

In a possible design, the MAC entity of the receiving device is further configured to: if determining that the current second expected receiving sequence number is not equal to the second sending sequence number of the MAC PDU, which indicates that the MAC PDU is a repeated data packet, return an expected receiving sequence number obtained by increasing the current second expected receiving sequence number by 1 to the MAC entity of the sending device; or if decoding fails, or a data packet returned by the MAC entity of the sending device is not received within preset duration, keep the current receiving sequence number unchanged, and return the current second expected receiving sequence number to the MAC entity of the sending device.

In the embodiments of the present invention, an existing LTE protocol stack is reused, functions of an RLC layer and a MAC layer are simplified, and signaling sending is reduced, to reduce device complexity, and reduce modifications to the existing LTE protocol stack.

BRIEF DESCRIPTION OF DRAWINGS

To describe the technical solutions in the embodiments of the present invention more clearly, the following briefly describes the accompanying drawings required for describing the embodiments or the conventional art. Apparently, the accompanying drawings in the following description show some embodiments of the present invention, and persons of ordinary skill in the art may still derive other drawings from these accompanying drawings without creative efforts.

DESCRIPTION OF EMBODIMENTS

Figure 1A:
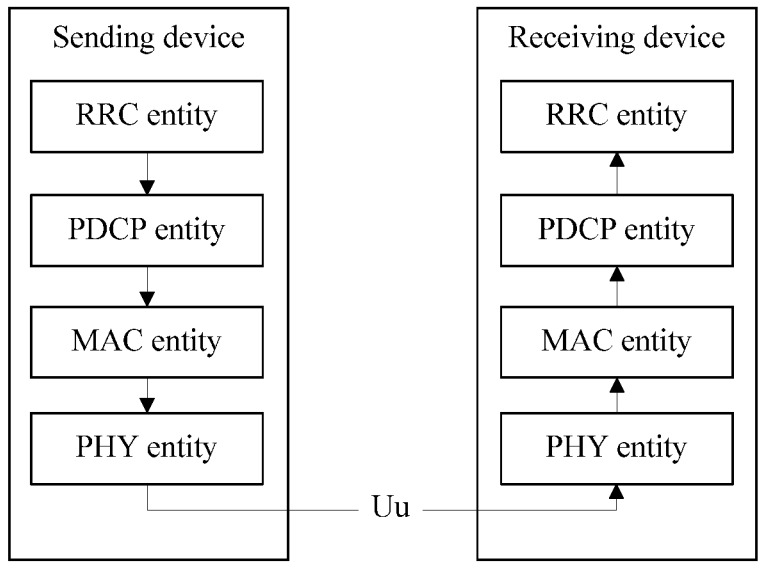
FIG. 1a is a first schematic diagram of a wireless network according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one components interacting with another component in a local system, a distributed system, and/or across a network such as the Internet interacting with other systems by using the signal).

In addition, aspects or features of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a CD (compact disk), a DVD (digital versatile disk), a smart card and a flash memory component (for example, EPROM (erasable programmable read-only memory), a card, a stick, or a key drive). In addition, various storage media described in this specification may indicate one or more devices and/or other machine-readable media that is used to store information. The term "machine-readable media" may include but is not limited to a radio channel, and various other media that can store, contain and/or carry an instruction and/or data.

A communications standard mentioned in implementations includes but is not limited to LTE, a future 5G network standard, or another cellular communications standard.

Referring to FIG. 1a, FIG. 1a is a schematic structural diagram of a wireless network according to an embodiment of the present invention. In this embodiment of the present invention, the wireless network includes a sending device and a receiving device. The sending device may be user equipment or a base station, and the receiving device may also be user equipment or a base station. In a downlink direction, the sending device is a base station, and the receiving device is user equipment. In an uplink direction, the sending device is user equipment, and the receiving device is a base station. The sending device includes an RRC (radio resource control) entity, a PDCP (Packet Data Convergence Protocol) entity, a MAC (Media Access Control) entity, and a PHY (Physical, physical) entity. The receiving device includes an RRC entity, a PDCP entity, a MAC entity, and a receiving PHY entity. The RRC entity of the sending device and the RRC entity of the receiving device are located at RRC layers. The PDCP entity of the sending device and the PDCP entity of the receiving device are located at PDCP layers. The MAC entity of the sending device and the MAC entity of the receiving device are located at MAC layers. The PHY entity of the sending device and the receiving PHY entity are located at physical layers. There is a PDCP-SAP between the RRC layer and the PDCP layer. There is a logical channel between the PDCP layer and the MAC layer. There is a transmission channel between the MAC layer and the physical layer. The sending device communicates with the receiving device by using a wireless interface (for example, a Uu interface).

A working procedure of the sending device is as follows: The sending RRC entity generates an RRC message or service data, where the RRC message is control plane (c-plane) data, and the service data is user plane (u-plane) data. The RRC message or the service data enters the sending PDCP entity by using a PDCP-SAP (service access point), and becomes a PDCP SDU (service data unit). The sending PDCP entity numbers each PDCP SDU; determines whether the PDCP SDU belongs to control plane data or user plane data; if the PDCP SDU is control plane data, performs integrity protection on the PDCP SDU, or if the PDCP SDU is user plane data, performs header compression on the PDCP SDU; encrypts a data packet obtained after integrity protection or header compression; uses the encrypted data packet as a payload, and adds a PDCP header to generate a PDCP PDU (protocol data unit); and transmits the PDCP PDU to the MAC entity of the sending device by using a corresponding logical channel. Then, the PDCP PDU becomes a MAC SDU. The MAC entity of the sending device performs undifferentiated multiplexing on MAC SDUs from different logical channels, that is, priorities of the logical channels are not distinguished; segments, concatenates, or re-segments the multiplexed data packet according to a transmission block size; uses a data packet obtained after segmentation, concatenation, or re-segmentation as a payload, and adds a MAC header and a sending sequence number to generate a MAC PDU; and transmits the MAC PDU to the PHY entity of the sending device by using a corresponding transmission channel. The PHY entity of the sending device transmits the MAC PDU to the MAC entity of the receiving device by using a wireless interface and the receiving PHY entity.

A working procedure of the receiving device is as follows: When the MAC entity of the receiving device successfully receives a MAC PDU, and the MAC PDU is not a repeated data packet, a MAC header is removed from the MAC PDU, and the MAC PDU is reassembled, a data packet obtained after removal of the MAC header and reassembly is demultiplexed to generate a MAC SDU on each logical channel, the MAC SDU is submitted to the PDCP entity of the receiving device by using the logical channel corresponding to the MAC SDU, and becomes a PDCP PDU. The PDCP entity of the receiving device removes a PDCP header from the PDCP PDU, decrypts a data packet obtained after removal of the PDCP header, determines a data type of the decrypted data packet, and if the decrypted data packet is a control plane data packet, performs integrity verification on the decrypted data packet, or if the decrypted data packet is a user plane data packet, performs header decompression on the decrypted data packet. The PDCP entity of the receiving device sequentially submits, according to sequence numbers of data packets obtained after integrity verification or decompression, the data packets obtained after integrity verification or decompression to the RRC entity of the receiving device. Because the MAC entity of the receiving device performs a HARQ of a single-threaded process, correspondingly the PDCP entity of the receiving device does not perform re-ordering.

During implementation of this embodiment of the present invention, some functions of an RLC layer are integrated into the MAC layer, and functions of the MAC layer and the PDCP layer are optimized, so as to simplify a protocol architecture, optimize a signaling transmission procedure, and reduce complexity of implementing a cellular Internet of Things device.

Figure 1B:
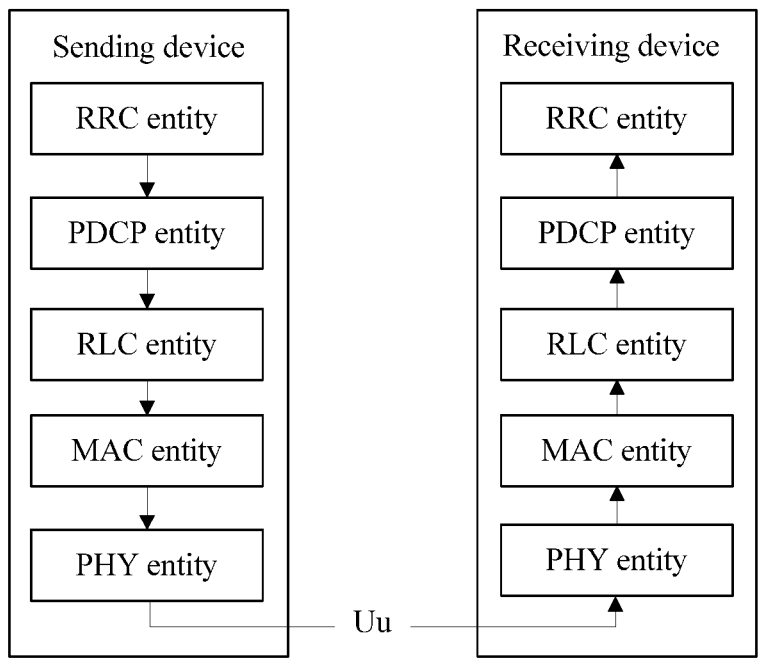
FIG. 1b is a second schematic diagram of a wireless network according to an embodiment of the present invention.

Referring to FIG. 1b, FIG. 1b is a schematic structural diagram of a wireless network according to an embodiment of the present invention. In this embodiment of the present invention, the wireless network includes a sending device and a receiving device. The sending device may be user equipment or a base station, and the receiving device may also be user equipment or a base station. In a downlink direction, the sending device is a base station, and the receiving device is user equipment. In an uplink direction, the sending device is user equipment, and the receiving device is a base station. The sending device includes an RRC entity, a PDCP entity, an RLC (radio link control) entity, a MAC entity, and a PHY entity. The receiving device includes an RRC entity, a PDCP entity, a receiving RCL entity, a MAC entity, and a receiving PHY entity. The RRC entity of the sending device and the RRC entity of the receiving device are located at RRC layers. The PDCP entity of the sending device and the PDCP entity of the receiving device are located at PDCP layers. The RLC entity of the sending device and the RLC entity of the receiving device are located at RLC layers. The MAC entity of the sending device and the receiving MAC layer are located at MAC layers. The PHY entity of the sending device and the receiving PHY entity are located at physical layers.

A working procedure of the sending device is as follows: The RRC entity of the sending device generates an RRC message or service data, where the RRC message is a control plane data packet, and the service data is a user plane data packet. The RRC message or the service data enters the PDCP layer by using a PDCP-SAP, and becomes a PDCP SDU. The PDCP entity of the sending device numbers the PDCP SDU; determines a data packet type of the PDCP SDU; if the PDCP SDU is a control plane data packet, performs integrity protection on the PDCP SDU, or if the PDCP SDU is a user plane data packet, performs header compression on the PDCP SDU; encrypts a data packet obtained after integrity protection or header compression processing; uses the encrypted data packet as a payload, and adds a PDCP header to generate a PDCP PDU; and if a data packet type of the PDCP PDU is a user plane data packet, routes the PDCP PDU. The PDCP entity of the sending device transmits the PDCP PDU to the RLC layer in a transparent transmission mode or an unacknowledged mode by using a corresponding logical channel, and the PDCP PDU becomes an RLC SDU. The RLC entity of the sending device segments, concatenates, or re-segments the RLC SDU, uses a data packet obtained after segmentation, concatenation, or re-segmentation as a payload, and adds an RLC header to generate an RLC PDU. The RLC entity of the sending device sends the generated RLC PDU to the MAC entity of the sending device by using a logical channel corresponding to the RLC PDU, and the RLC PDU becomes a MAC SDU after entering the MAC layer. The MAC entity of the sending device obtains a priority of the logical channel, allocates a transmission resource to the MAC SDU according to a preset priority policy, multiplexes the data packet to which the transmission resource is allocated, uses the multiplexed data packet as a payload, and adds a MAC header to generate a MAC PDU. The MAC entity of the sending device sends the generated MAC PDU to the MAC entity of the receiving device by using the physical entity of the sending device and the physical entity of the receiving device.

A working procedure of the receiving device is as follows: The MAC entity of the receiving device demultiplexes a MAC PDU sent by the MAC entity of the sending device to generate a demultiplexed data packet. The MAC entity of the receiving device removes a MAC header from the demultiplexed data packet to generate a MAC SDU, and the MAC SDU enters the RLC layer, and becomes an RLC PDU. The RLC entity of the receiving device receives RLC PDUs by using logical channels. The RLC entity of the receiving device reassembles the RLC PDU, and removes an RLC header to generate an RLC SDU. The RLC entity of the receiving device submits the RLC SDU to the PDCP entity of the receiving device, and the RLC SDU becomes a PDCP PDU. The PDCP entity of the receiving device removes a PDCP header from the PDCP PDU, decrypts a data packet obtained after removal of the PDCP header, determines a data type of the decrypted data packet, and if the decrypted data packet is a control plane data packet, performs integrity verification on the decrypted data packet, or if the decrypted data packet is a user plane data packet, performs header decompression on the decrypted data packet. The PDCP entity of the receiving device sequentially submits, according to sequence numbers of data packets obtained after integrity verification or decompression, the data packets obtained after integrity verification or decompression to the RRC entity of the receiving device. Because the MAC entity of the receiving device performs a HARQ of a single-threaded process, correspondingly the PDCP entity of the receiving device does not perform re-ordering.

During implementation of this embodiment of the present invention, functions of the RLC layer and the MAC layer are simplified, so as to simplify a protocol architecture, optimize a signaling transmission procedure, and reduce complexity of implementing a cellular Internet of Things device.

Figure 2:
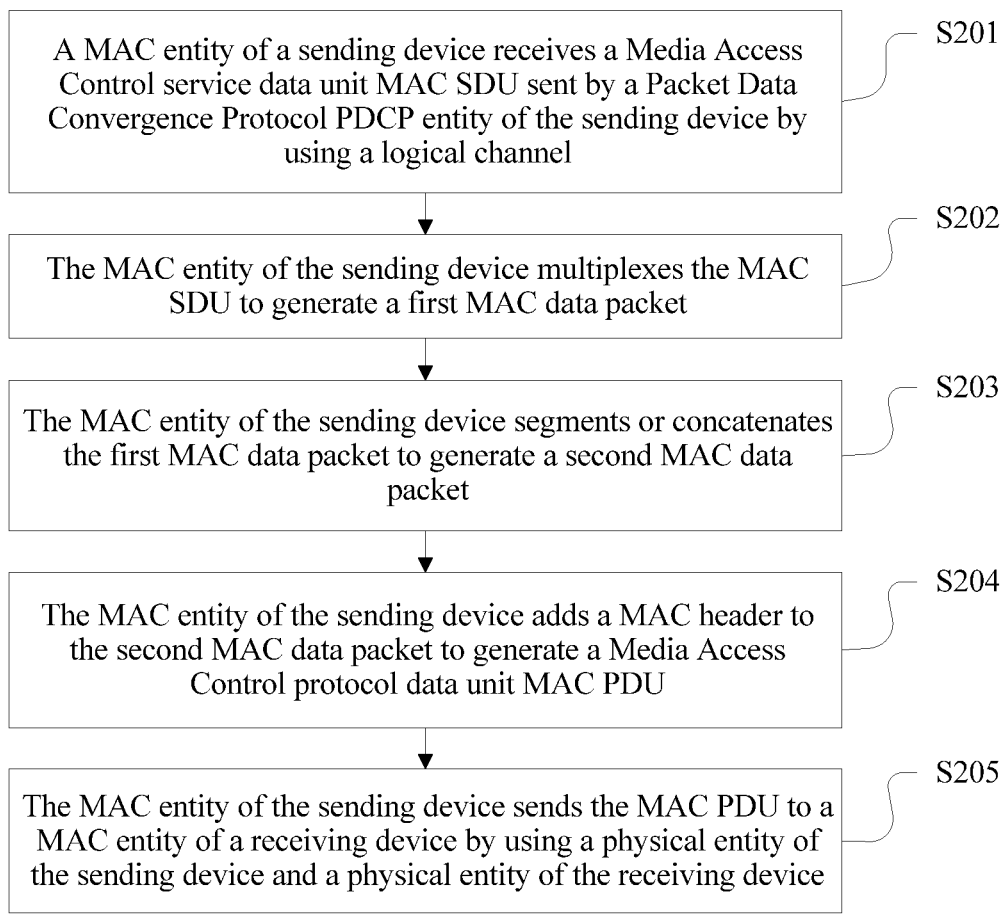
FIG. 2 is a first schematic diagram of a data sending method according to an embodiment of the present invention.

Referring to FIG. 2, FIG. 2 is a schematic flowchart of a data sending method according to an embodiment of the present invention. In this embodiment of the present invention, the method includes the following steps.

S201. A MAC entity of a sending device receives a MAC SDU sent by a PDCP entity of the sending device by using a logical channel, where a transmission mode of the PDCP entity is a transparent transmission mode or an unacknowledged mode.

Specifically, the MAC entity of the sending device is located at a MAC layer, and the PDCP entity of the sending device is located at a PDCP layer. Data (signaling data or service data) sent by an RRC entity of the sending device to the PDCP entity of the sending device becomes a PDCP SDU after entering the PDCP entity of the sending device. Each PDCP SDU is numbered, and a data type of each PDCP SDU is identified. If the PDCP SDU is control plane data, integrity protection is performed on the PDCP SDU. If the PDCP SDU is user plane data, header compression is performed on the PDCP SDU. Data obtained after integrity protection or header compression is encrypted, and a PDCP header is added to generate a PDCP PDU. If the PDCP PDU is user plane data, the PDCP PDU is routed. The PDCP entity of the sending device sends the PDCP PDU by using a corresponding logical channel. The PDCP PDU enters the MAC layer, and becomes a MAC SDU. The MAC entity of the sending device receives the MAC SDU by using the logical channel.

Because an RLC transmission mode corresponding to the PDCP entity of the sending device is only a transparent transmission mode and an unacknowledged mode, correspondingly only a TM RLC entity of the sending device and a UM RLC entity of the sending device are reserved in an RLC entity of the sending device, and only a receiving TM RLC entity and a receiving UM RLC entity are reserved in an RLC entity of a receiving device. Data borne on an AM RLC entity of the sending device or a function mapped to an AM RLC entity of the sending device needs to be completed by the UM RLC entity of the sending device. The RLC entity of the receiving device performs corresponding adjustment according to a result of the RLC entity of the sending device.

S202. The MAC entity of the sending device multiplexes the MAC SDU to generate a first MAC data packet.

Specifically, the MAC entity of the sending device multiplexes the MAC SDU and a MAC SDU on another logical channel to generate the first MAC data packet. During multiplexing of a plurality of MAC SDUs, priorities of logical channels are not distinguished, and undifferentiated multiplexing is performed on the MAC SDUs on the plurality of logical channels.

S203. The MAC entity of the sending device segments, concatenates, or re-segments the first MAC data packet to generate a second MAC data packet.

Specifically, a specific process of segmenting or concatenating, by the MAC entity of the sending device, the first MAC data packet generated after multiplexing is as follows: The MAC entity of the sending device presets a transmission block size, and when a length of the first MAC data packet is greater than the transmission block size, segments the first MAC data packet to generate at least one segmented data packet, and the MAC entity of the sending device selects one of the at least one segmented data packet as the second MAC data packet; or when a length of the multiplexed data packet is less than the transmission block size, concatenates the first MAC data packet, that is, a current first MAC data packet follows behind a previous first MAC data packet by means of concatenation, and the second MAC data packet is generated until a whole transmission block is fully filled.

S204. The MAC entity of the sending device adds a MAC header to the second MAC data packet to generate a MAC PDU.

Specifically, the MAC entity of the sending device uses the second MAC data packet as a payload, and adds the MAC header to the second MAC data packet to generate the MAC PDU.

S205. The MAC entity of the sending device sends the MAC PDU to a MAC entity of a receiving device by using a physical entity of the sending device and a physical entity of the receiving device.

Specifically, the MAC entity of the sending device sends, according to a mapping relationship between a logical channel and a transmission channel, the currently generated MAC PDU to the physical entity of the sending device by using a transmission channel, and the physical entity of the sending device sends the MAC PDU to the physical entity of the receiving device and the MAC entity of the receiving device by using a Uu interface.

During implementation of this embodiment of the present invention, the RLC entity is omitted, some functions of the RLC entity are performed by the MAC entity, and some functions of the MAC entity are deleted. In this way, the sending device becomes simpler, and complexity of the sending device is reduced, so as to use the sending device as a cellular Internet of Things device.

Optionally, that the MAC entity of the sending device adds a MAC header to the second MAC data packet to generate a MAC PDU further includes:

the MAC entity of the sending device adds, to the second MAC data packet, a MAC header that carries a sending sequence number, to generate the MAC PDU.

The method further includes:

receiving, by the MAC entity of the sending device, an expected receiving sequence number returned by the MAC entity of the receiving device according to the MAC PDU;

determining whether the returned expected receiving sequence number is equal to a sending sequence number of a next MAC PDU; and if the returned expected receiving sequence number is equal to the sending sequence number of the next MAC PDU, which indicates that the MAC PDU is correctly transmitted, sending, by the MAC entity of the sending device, the next MAC PDU to the MAC entity of the receiving device; or if the returned expected receiving sequence number is not equal to the sending sequence number of the next MAC PDU, which indicates that the MAC PDU is incorrectly transmitted, retransmitting, by the MAC entity of the sending device, the MAC PDU.

Specifically, in a segmentation or concatenation process, the MAC entity of the sending device adds a sending sequence number to each MAC header. That is, each time a MAC SDU arrives, a sending sequence number of the MAC SDU is increased by 1 based on a sending sequence number of a last MAC SDU. A process of counting by increasing the sending sequence number by 1 is cycle counting, that is, the sending sequence number returns to zero when exceeding a maximum value. A MAC PDU is generated according to a MAC SDU, and a sending sequence number of the MAC PDU is a sending sequence number of the MAC SDU. The MAC entity of the receiving device maintains an expected receiving sequence number. Initial values of the sending sequence number and the expected receiving sequence number are equal. The MAC entity of the sending device and the MAC entity of the receiving device implement a HARQ function by using the sending sequence number and the receiving sequence number. The MAC entity of the sending device starts only one HARQ process each time, that is, after the MAC entity of the sending device sends a MAC PDU to the MAC entity of the receiving device, the MAC entity of the sending device performs sending again only when the MAC entity of the receiving device returns a feedback message. An implementation principle is as follows:

In an initial state (for example, both the sending device and the receiving device access a network for the first time), values of the sending sequence number and the expected receiving sequence number are equal. The MAC entity of the sending device sends a MAC PDU to the MAC entity of the receiving device. The MAC entity of the receiving device decodes the received MAC PDU. If decoding succeeds, the MAC entity of the receiving device obtains a sending sequence number of the MAC PDU by means of parsing, compares the sending sequence number of the MAC PDU with a current expected receiving sequence number, and if the sending sequence number of the MAC PDU is equal to the current expected receiving sequence number, increases the current expected receiving sequence number by 1, and returns an expected receiving sequence number obtained by increasing the current expected receiving sequence number by 1 to the MAC entity of the sending device. If decoding succeeds, and the sending sequence number of the MAC PDU is not equal to the current expected receiving sequence number, it indicates that the currently received MAC PDU is a repeated data packet, the currently received MAC PDU is discarded, a value of the current expected receiving sequence number remains unchanged, and the current expected receiving sequence number is returned to the MAC entity of the sending device. If decoding fails, or the MAC entity of the receiving device does not receive, within preset duration, the MAC PDU sent by the MAC entity of the sending device, the current expected receiving sequence number remains unchanged, and the current expected receiving sequence number is returned to the MAC entity of the sending device.

A processing process of the MAC entity of the sending device is as follows: The MAC entity of the sending device receives the expected receiving sequence number returned by the MAC entity of the receiving device, and compares the returned expected receiving sequence number with a value of a sending sequence number of a next MAC PDU. If a value of the returned expected receiving sequence number is equal to the value of the sending sequence number of the next MAC PDU, it indicates that the current MAC PDU is successfully transmitted to the MAC entity of the receiving device, the MAC entity of the sending device sends the next MAC PDU to the MAC entity of the receiving device, and the sending sequence number of the next MAC PDU is increased by 1 based on the current MAC PDU. If a value of the returned expected receiving sequence number is not equal to the value of the sending sequence number of the next MAC PDU, it indicates that the current MAC PDU is not successfully transmitted to the MAC entity of the receiving device, the MAC entity of the sending device retransmits the current MAC PDU, and the sending sequence number of the current MAC PDU remains unchanged.

It may be understood that maximum values of the sending sequence number maintained by the MAC entity of the sending device and the expected receiving sequence number maintained by the MAC entity of the receiving device are equal, and initial values are equal.

Optionally, the retransmitting, by the MAC entity of the sending device, the MAC PDU includes:

extracting, by the MAC entity of the sending device, the MAC PDU from a buffer, and rescheduling a transmission resource for the MAC PDU; and if the rescheduled transmission resource meets a condition of transmitting the MAC PDU at a time, retransmitting the MAC PDU to the MAC entity of the receiving device; or if the rescheduled transmission resource does not meet a condition of transmitting the MAC PDU at a time, re-segmenting the MAC PDU before retransmission.

Each time the MAC entity of the sending device sends a MAC PDU, the MAC entity of the sending device stores the MAC PDU in the buffer. If the MAC PDU is successfully transmitted, the MAC PDU stored in the buffer is deleted. If the MAC PDU is not successfully transmitted, a transmission resource needs to be scheduled to retransmit the MAC PDU. If the MAC PDU can be transmitted at a time by using the scheduled transmission resource, the MAC PDU is directly retransmitted. If the MAC PDU cannot be transmitted at a time by using the scheduled transmission resource, the MAC PDU is re-segmented to meet a requirement of the scheduled transmission resource, and the re-segmented data packet is retransmitted to the MAC entity of the receiving device at a plurality of times.

Optionally, the method further includes:

if the MAC entity of the sending device does not receive, within preset duration, an expected receiving sequence number returned by the MAC entity of the receiving device according to the MAC PDU, entering, by the MAC entity of the sending device, a sleep state; and when preset sleep duration expires, re-establishing, by the MAC entity of the sending device, a connection to the MAC entity of the receiving device.

When the MAC entity of the receiving device does not receive the MAC PDU from the sending device because of a reason such as channel interference, the MAC entity of the receiving device does not return the expected receiving sequence number to the MAC entity of the sending device. After a timer of the MAC entity of the sending device expires, the MAC entity of the sending device enters the sleep state. After the preset sleep duration expires, the MAC entity of the sending device re-establishes a connection to the MAC entity of the receiving device.

Optionally, initial values of the sending sequence number and the receiving sequence number are equal, and both quantities of bits are 1.

The initial values of the sending sequence number and the receiving sequence number are equal, and the quantities of bits are 1, that is, values of the sending sequence number and the expected receiving sequence number are 0 or 1.

The following uses a specific embodiment to describe the data sending method according to this embodiment of the present invention. In this embodiment, a sending MAC entity is located in a base station, and a receiving MAC entity is located in user equipment UE. An interaction procedure is as follows:

1. The base station sends downlink resource allocation information to the user equipment, where the downlink resource allocation information is used to allocate a downlink transmission resource to the user equipment.

A sending sequence number SN maintained by the base station is equal to 0, and an expected receiving sequence number ESN maintained by the user equipment is equal to 0.

2. The base station sends a current MAC PDU (SN=0) to the user equipment by using the allocated downlink transmission resource.

3. The user equipment receives the current MAC PDU, and successfully decodes the current MAC PDU. The user equipment compares a current expected receiving sequence number ESN with the sending sequence number SN of the current MAC PDU: ESN=SN=0, which indicates that the current MAC PDU is not a repeated data packet, then increases the current expected receiving sequence number by 1: ESN=0+1=1, and returns the ESN (1) to the base station.

4. The base station receives the returned ESN (1), and determines, by means of comparison, that the returned ESN is equal to a sending sequence number (1) of a next MAC PDU, which indicates that the current MAC PDU is successfully transmitted to the user equipment.

If the returned ESN received by the base station is equal to 0 because of a reason such as channel interference, and it is determined, by means of comparison, that the returned ESN is not equal to the sending sequence number of the next MAC PDU, it indicates that the current MAC PDU is not successfully transmitted to the user equipment (the current MAC PDU is actually successfully transmitted). In this case, the base station retransmits the current MAC PDU (SN=0) to the user equipment. The user equipment receives the current MAC PDU, determines, by means of comparison, that the current expected receiving sequence number ESN=1 is not equal to the sending sequence number (SN=0) of the current MAC PDU, which indicates that the current MAC PDU is a repeated data packet, then discards the current MAC PDU, keep the current expected receiving sequence number ESN (1) unchanged, and returns the current ESN (1) to the base station. The base station receives the current ESN (1), and determines, by means of comparison, that the sending sequence number (SN=1) of the next MAC PDU is equal to the current expected receiving sequence number (ESN=1), and the base station sends the next MAC PDU to the user equipment. According to the foregoing method, only one bit is required to implement error retransmission and repetition detection of the receiving device, thereby greatly reducing device complexity.

Optionally, before the MAC entity of the sending device receives the MAC SDU sent by the PDCP entity of the sending device by using the logical channel, the method further includes:

obtaining a priority of the logical channel, and allocating a transmission resource to the MAC SDU according to the priority of the logical channel.

A transmission resource is preferentially allocated to a data packet on a logical channel with a high priority. A bearer type of the logical channel is an SRB or a DRB. A priority of the SRB is higher than a priority of the DRB.

Figure 3:
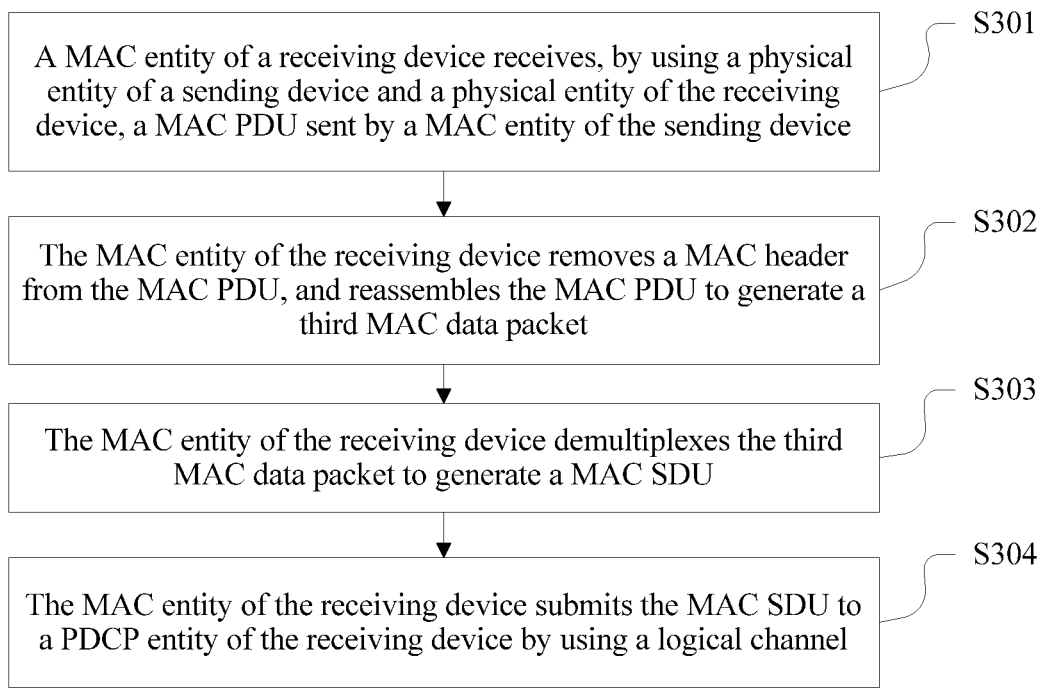
FIG. 3 is a first schematic diagram of a data receiving method according to an embodiment of the present invention.

Referring to FIG. 3, FIG. 3 is a schematic flowchart of a data receiving method according to an embodiment of the present invention. In this embodiment of the present invention, the method includes the following steps.

S301. A MAC entity of a receiving device receives, by using a physical entity of a sending device and a physical entity of the receiving device, a MAC PDU sent by a MAC entity of the sending device.

Specifically, the receiving device includes the physical entity, the MAC entity, a PDCP entity, and an RRC entity. The physical entity of the receiving device is located at a physical layer, the MAC entity of the receiving device is located at a MAC layer, the PDCP entity of the receiving device is located at a PDCP layer, and the RRC entity of the receiving device is located at an RRC layer. A channel between the receiving PDCP layer and the receiving MAC layer is a logical channel, a channel between the MAC layer and the physical layer is a transmission channel, and the MAC entity of the receiving device receives a MAC PDU transmitted on each transmission channel.

S302. The MAC entity of the receiving device removes a MAC header from the MAC PDU, and reassembles the MAC PDU to generate a third MAC data packet.

Specifically, the MAC PDU becomes a payload data packet after the MAC entity of the receiving device removes the MAC header from the MAC PDU, and the payload data packet is reassembled to generate the third MAC data packet. A reassembly process is an inverse process of segmentation or concatenation.

S303. The MAC entity of the receiving device demultiplexes the third MAC data packet to generate a MAC SDU.

Specifically, the third data packet is demultiplexed to generate a plurality of MAC SDUs.

S304. The MAC entity of the receiving device submits the MAC SDU to a PDCP entity of the receiving device by using a logical channel.

The MAC entity of the receiving device submits, according to a mapping relationship between a transmission channel and a logical channel, the plurality of MAC SDUs to the PDCP entity of the receiving device by using respective corresponding logical channels.

During implementation of this embodiment of the present invention, an RLC entity is omitted, some functions of the RLC entity are performed by the MAC entity, and some functions of the MAC entity are deleted. In this way, the sending device becomes simpler, and complexity of the sending device is reduced, so as to use the sending device as a cellular Internet of Things device.

Optionally, before the MAC entity of the receiving device removes the MAC header from the MAC PDU, and reassembles the MAC PDU to generate the third MAC data packet, the method further includes:

decoding, by the MAC entity of the receiving device, the MAC PDU;

if decoding succeeds, continuing to determine whether a current expected receiving sequence number is equal to a sending sequence number of the MAC PDU; and if the current expected receiving sequence number is equal to the sending sequence number of the MAC PDU, which indicates that the MAC PDU is not a repeated data packet, returning an expected receiving sequence number obtained by increasing the current expected receiving sequence number by 1 to the MAC entity of the sending device.

The MAC entity of the receiving device performs error detection and repetition detection. The MAC entity of the sending device maintains a sending sequence number for a MAC PDU. Each time a MAC PDU is sent, a corresponding sending sequence number is increased by 1, and the sending sequence number returns to zero when exceeding a maximum value, that is, cycle counting. The MAC entity of the receiving device maintains an expected receiving sequence number. The expected receiving sequence number is increased by 1 after a specific condition is met, and the expected receiving sequence number returns to zero when exceeding a maximum value, that is, cycle counting. Initial values of the sending sequence number and the expected receiving sequence number are equal, and the maximum values are equal. The MAC entity of the receiving device decodes the currently received MAC PDU, if decoding succeeds, obtains the sending sequence number of the current MAC PDU and the current expected receiving sequence number, and compares the sending sequence number with the current expected receiving sequence number. If the sending sequence number is equal to the current expected receiving sequence number, it indicates that the current MAC PDU is not a repeated data packet, and the current expected receiving sequence number is returned to the MAC entity of the sending device.

Optionally, if the current expected receiving sequence number is not equal to the sending sequence number of the MAC PDU, and when compared with a stored sending sequence number that is received last time, the sending sequence number of the MAC PDU is not flipped but is expected to be flipped, it indicates that the MAC PDU is a repeated data packet, the current receiving sequence number remains unchanged, and the current receiving sequence number is returned to the MAC entity of the sending device.

Alternatively, if the current expected receiving sequence number is not equal to the sending sequence number of the MAC PDU, and when compared with a stored sending sequence number that is received last time, the sending sequence number of the MAC PDU is flipped but is not expected to be flipped, it indicates that a MAC PDU is lost, the current receiving sequence number remains unchanged, and the current receiving sequence number is returned to the MAC entity of the sending device.

Alternatively, if decoding fails, or a data packet sent by the MAC entity of the sending device is not received within preset duration, the current expected receiving sequence number remains unchanged, and the current expected receiving sequence number is returned to the MAC entity of the sending device.

The MAC entity of the sending device adds a sending sequence number to each MAC PDU. A value of the sending sequence number is 0 or 1. Each time the MAC entity of the receiving device receives a MAC PDU, the MAC entity of the receiving device stores a sending sequence number of the MAC PDU. The MAC entity of the receiving device compares the sending sequence number carried in the currently received MAC PDU with a stored sending sequence number of a MAC PDU that is received last time to determine whether a data packet is lost. A specific method for determining a packet loss may be as follows: If determining that the stored current expected receiving sequence number is not equal to the sending sequence number of the received MAC PDU, the MAC entity of the receiving device further determines a flip status obtained when the sending sequence number of the received MAC PDU is compared with the stored sending sequence number that is received last time. If the sending sequence number of the received MAC PDU is actually flipped, but the MAC entity of the receiving device does not expect the sending sequence number of the received MAC PDU to be flipped, it indicates that a data packet between the currently received MAC PDU and the MAC PDU that is received last time is lost, and the MAC entity of the receiving device needs to instruct the MAC entity of the sending device to retransmit the lost MAC PDU. It should be noted that, that the sending sequence number is flipped means that the sending sequence number changes from 0 to 1 or from 1 to 0, and that the sending sequence number is not flipped means that the sending sequence number is 0 or 1 and remains unchanged.

Optionally, initial values of the sending sequence number and the expected receiving sequence number are equal, and both quantities of bits are 1.

The initial values of the sending sequence number and the expected receiving sequence number are equal, and values of the sending sequence number and the expected receiving sequence number are only 0 or 1.

For example, both the initial values of the sending sequence number SN and the expected receiving sequence number ESN are 1, that is, SN=1, and ESN=1. The MAC entity of the sending device sends a current MAC PDU (SN=1) to the MAC entity of the receiving device, and the MAC entity of the receiving device decodes the current MAC PDU. After decoding succeeds, the SN of the current MAC PDU is compared with the current ESN, and it is found that SN=ESN. Therefore, it indicates that the current MAC PDU is not a repeated data packet, the current expected receiving sequence number is increased by 1, and the ESN overflows to zero, that is, ESN=1+1=0. The MAC entity of the receiving device returns the ESN(0) to the MAC entity of the sending device.

Figure 4:
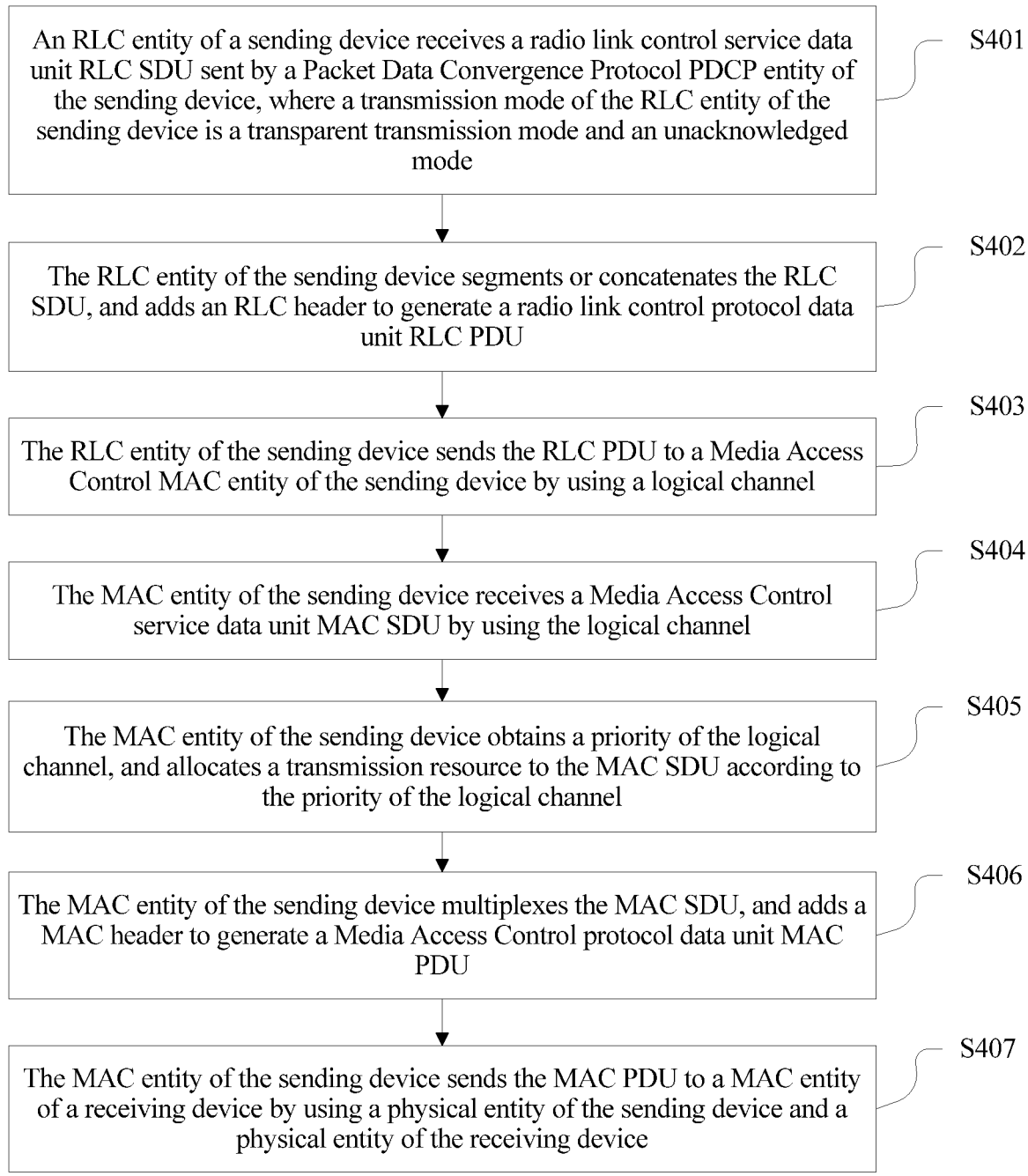
FIG. 4 is a second schematic diagram of a data sending method according to an embodiment of the present invention.

Referring to FIG. 4, FIG. 4 is a schematic flowchart of a data sending method according to an embodiment of the present invention. In this embodiment of the present invention, the method includes the following steps.

S401. An RLC entity of a sending device receives an RLC SDU sent by a PDCP entity of the sending device, where a transmission mode of the RLC entity of the sending device is a transparent transmission mode and an unacknowledged mode.

Specifically, the sending device includes an RRC entity, the PDCP entity, the RLC entity, a MAC entity, and a physical entity. The RRC entity of the sending device is located at an RRC layer, the PDCP entity of the sending device is located at a PDCP layer, the RLC entity of the sending device is located at an RLC layer, the MAC entity of the sending device is located at a MAC layer, and the physical entity of the sending device is located at a physical layer. A channel between the RLC layer and the MAC layer is a logical channel, and a channel between the MAC layer and the physical layer is a transmission channel. A PDCP PDU generated by the PDCP entity becomes an RLC SDU after entering the RLC entity, and the RLC entity of the sending device receives the RLC SDU sent by the PDCP entity of the sending device. The transmission mode of the RLC entity of the sending device is the transparent transmission mode or the unacknowledged mode, that is, the RLC entity of the sending device includes a TM entity of the sending device or a UM entity of the sending device.

S402. The RLC entity of the sending device segments, concatenates, or re-segments the RLC SDU, and adds an RLC header to generate an RLC PDU.

Specifically, when a length of the RLC SDU is greater than a transmission block size, the RLC SDU is segmented. When a length of the RLC SDU is less than a transmission block size, the RLC SDU is concatenated, and a current RLC SDU follows behind a previous RLC SDU by means of concatenation until a whole transmission block is fully filled. The transmission block size is set at the MAC layer. If the MAC entity instructs the RLC entity to perform re-segmentation because a retransmission resource is less than a to-be-retransmitted MAC PDU, the RLC entity extracts the RLC SDU from a buffer, and re-segments the RLC SDU. A data packet obtained after segmentation, concatenation, or re-segmentation is used as a payload, and the RLC header is added to generate the RLC PDU.

Because a transmission mode of the PDCP entity of the sending device is only a transparent transmission mode and an unacknowledged mode, correspondingly only a TM RLC entity of the sending device and a UM RLC entity of the sending device are reserved in the RLC entity of the sending device, and only a receiving TM RLC entity and a receiving UM RLC entity are reserved in an RLC entity of a receiving device. Data borne on an AM RLC entity of the sending device or a function mapped to an AM RLC entity of the sending device needs to be completed by the UM RLC entity of the sending device. The RLC entity of the receiving device performs corresponding adjustment according to a result of the RLC entity of the sending device.

S403. The RLC entity of the sending device sends the RLC PDU to a MAC entity of the sending device by using a logical channel.

Specifically, the RLC entity sends generated RLC PDUs to the MAC entity by using respective corresponding logical channels. The RLC PDU becomes a MAC SDU after entering the MAC layer.

S404. The MAC entity of the sending device receives a MAC SDU by using the logical channel.

S405. The MAC entity of the sending device obtains a priority of the logical channel, and allocates a transmission resource to the MAC SDU according to the priority of the logical channel.

Specifically, the MAC entity of the sending device obtains a priority of each logical channel, and a transmission resource is preferentially allocated to a data packet on a logical channel with a high priority.

S406. The MAC entity of the sending device multiplexes the MAC SDU, and adds a MAC header to generate a MAC PDU.

The MAC entity of the sending device multiplexes the MAC SDU to which the transmission resource is allocated to generate a multiplexed data packet, uses the multiplexed data packet as a payload, and adds the MAC header to generate the MAC PDU.

S407. The MAC entity of the sending device sends the MAC PDU to a MAC entity of a receiving device by using a physical entity of the sending device and a physical entity of the receiving device.

The MAC entity of the sending device sends the generated MAC PDU to the physical entity of the sending device according to a mapping relationship between a logical channel and a transmission channel, and the physical entity of the sending device transmits the MAC PDU to the MAC entity of the receiving device by using a wireless interface and the physical entity of the receiving device.

During implementation of this embodiment of the present invention, functions of the RLC entity of the sending device at the RLC layer and the MAC entity of the sending device at the MAC layer are simplified. Therefore, complexity of the sending device is reduced, to adapt to construction of cellular Internet of Things.

Optionally, that the RLC entity of the sending device segments, concatenates, or re-segments the RLC SDU, and adds an RLC header to generate an RLC PDU further includes:

the RLC entity of the sending device segments or concatenates the RLC SDU, and adds an RLC header that carries a first sending sequence number to generate the RLC PDU.

The method further includes:

if the MAC entity of the sending device receives an ACK returned by the MAC entity of the receiving device according to the MAC PDU, sending a next MAC PDU to the MAC entity of the sending device; or if the MAC entity of the sending device receives a NACK returned by the MAC entity of the receiving device according to the MAC PDU, retransmitting the MAC PDU to the MAC entity of the sending device.

Specifically, the RLC entity of the sending device adds a first sending sequence number to each RLC PDU. Each time the RLC entity of the sending device generates an RLC PDU, a first sending sequence number of the generated RLC PDU is increased by 1 based on a first sending sequence number of a last RLC PDU. The first sending sequence number returns to zero when exceeding a maximum value, that is, cycle counting. The RLC entity of the receiving device locally maintains a first expected receiving sequence number. When a specific condition is met, the first expected receiving sequence number is increased by 1. The first expected receiving sequence number returns to zero when exceeding a maximum value, that is, cycle counting. Initial values of the first sending sequence number and the first expected receiving sequence number are equal, and the maximum values are equal. A principle of performing repetition detection by the RLC entity of the receiving device is as follows:

The MAC entity of the sending device sends a current MAC PDU to the MAC entity of the receiving device. The MAC entity of the receiving device decodes the current MAC PDU. If decoding succeeds, the MAC entity of the receiving device demultiplexes the current MAC PDU and removes a MAC header from the current MAC PDU, and then transfers the current MAC PDU to the RLC entity of the receiving device by using a logical channel, and the current MAC PDU becomes an RLC PDU. The RLC entity of the receiving device performs repetition detection on the RLC PDU. The RLC entity of the receiving device obtains a current first expected receiving sequence number, obtains a first sending sequence number of the received RLC PDU, and determines, by means of comparison, whether the current first expected receiving sequence number is equal to the first sending sequence number. If the current first expected receiving sequence number is equal to the first sending sequence number of the RLC PDU, it indicates that the received RLC PDU is not a repeated data packet, the current first expected receiving sequence number is increased by 1, and the MAC entity of the receiving device is instructed to return an ACK to the MAC entity of the sending device, to indicate that the MAC entity of the receiving device successfully decodes the current MAC PDU. If the current first expected receiving sequence number is not equal to the first sending sequence number of the RLC PDU, it indicates that the RLC PDU is a repeated data packet, the received RLC PDU is discarded, the current first expected receiving sequence number remains unchanged, and the MAC entity of the receiving device is instructed to return an ACK to the MAC entity of the sending device, to indicate that the MAC entity of the receiving device successfully decodes the current MAC PDU. If the MAC entity of the receiving device fails to successfully decode the current MAC PDU, or does not receive the MAC PDU sent by the sending device within preset duration, the MAC entity of the receiving device returns a NACK to the MAC entity of the sending device.

If the MAC entity of the sending device receives the ACK returned by the MAC entity of the receiving device, it indicates that the current MAC PDU is successfully transmitted to the MAC entity of the receiving device, and the MAC entity of the sending device sends a next MAC PDU. If the MAC entity of the sending device receives the NACK returned by the MAC entity of the receiving device, it indicates that the current MAC PDU is not successfully transmitted to the MAC entity of the receiving device, and the MAC entity of the sending device retransmits the current MAC PDU; if a scheduled resource is greater than the MAC PDU that needs to be retransmitted, the MAC PDU is directly retransmitted, or if a scheduled resource is not greater than the MAC PDU that needs to be retransmitted, the RLC entity is instructed to perform re-segmentation, and the MAC PDU is retransmitted at a plurality of times. If the MAC entity of the sending device does not receive, within preset duration, a feedback message (the ACK or the NACK) returned by the MAC entity of the receiving device, the MAC entity of the sending device enters a sleep state, and after preset sleep time ends, re-establishes a data connection to the MAC entity of the receiving device.

Optionally, the retransmitting the MAC PDU to the MAC entity of the sending device includes:

rescheduling a transmission resource for the MAC PDU; and if the rescheduled transmission resource meets a condition of transmitting the MAC PDU at a time, retransmitting the MAC PDU to the MAC entity of the receiving device; or if the rescheduled transmission resource does not meet a condition of transmitting the MAC PDU at a time, instructing the RLC entity of the sending device to extract the RLC PDU corresponding to the MAC PDU from a buffer, and re-segmenting the RLC PDU; and generating, by the MAC entity of the sending device, a plurality of corresponding MAC PDUs according to the re-segmented RLC PDU, and sequentially retransmitting the plurality of MAC PDUs.

After sending an RLC PDU to the MAC PDU of the sending device, the RLC entity of the sending device stores the RLC PDU in the buffer. After transmitting a MAC PDU corresponding to the RLC PDU, if determining that the MAC PDU is successfully transmitted, the MAC entity of the sending device instructs the RLC entity of the sending device to delete the RLC PDU in the buffer, or if determining that the MAC PDU is not successfully transmitted, the MAC entity of the sending device reschedules a resource to retransmit the MAC PDU, and if the rescheduled transmission resource meets a condition of retransmitting the MAC PDU at a time, retransmits the MAC PDU to the MAC entity of the receiving device, or if the rescheduled transmission resource does not meet a condition of transmitting the MAC PDU at a time, instructs the RLC entity of the sending device to re-segment the RLC PDU corresponding to the MAC PDU. The RLC entity of the sending device extracts the RLC PDU from the buffer, re-segments the RLC PDU, and then retransmits the RLC PDU to the MAC entity of the sending device at a plurality of times. The MAC entity of the sending device performs retransmission at a plurality of times.

Optionally, that the MAC entity of the sending device multiplexes the MAC SDU, and adds a MAC header to generate a MAC PDU further includes:

the MAC entity of the sending device multiplexes the MAC SDU, and adds a MAC header that carries a second sending sequence number to generate the MAC PDU.

The method further includes:

receiving, by the MAC entity of the sending device, a second expected receiving sequence number returned by the MAC entity of the receiving device according to the MAC PDU;

determining whether the second expected receiving sequence number is equal to a second sending sequence number of a next MAC PDU; and if the second expected receiving sequence number is equal to the second sending sequence number of the next MAC PDU, which indicates that the MAC PDU is correctly transmitted, sending, by the MAC entity of the sending device, the next MAC PDU to the MAC entity of the receiving device; or if the second expected receiving sequence number is not equal to the second sending sequence number of the next MAC PDU, which indicates that the MAC PDU is incorrectly transmitted, retransmitting, by the MAC entity of the sending device, the MAC PDU.

The MAC entity of the sending device adds a second sending sequence number to a MAC header of each MAC PDU. Each time the MAC entity of the sending device generates a MAC PDU, a second sending sequence number of the generated MAC PDU is increased by 1 based on a last MAC PDU. The second sending sequence number returns to zero when exceeding a maximum value, that is, cycle counting. The MAC entity of the receiving device maintains a second expected receiving sequence number. When a specific condition is met, the second expected receiving sequence number is increased by 1, and the second expected receiving sequence number returns to zero when exceeding a maximum value, that is, cycle counting. Initial values of the second sending sequence number and the second expected receiving sequence number are equal, and the maximum values are also equal. The MAC entity of the sending device and the MAC entity of the receiving device implement a HARQ by using the second sending sequence number and the second expected receiving sequence number. The MAC entity of the sending device starts only one HARQ process each time. An implementation principle is as follows:

In an initial state, values of the second sending sequence number and the second expected receiving sequence number are equal. The MAC entity of the sending device sends a current MAC PDU to the MAC entity of the receiving device. The MAC entity of the receiving device decodes the currently received MAC PDU. If decoding succeeds, the MAC entity of the receiving device obtains a second sending sequence number of the current MAC PDU by means of parsing, and the MAC entity of the receiving device obtains a current second expected receiving sequence number. The MAC entity of the sending device compares the second sending sequence number of the current MAC PDU with the current second expected receiving sequence number. If the second sending sequence number of the current MAC PDU is equal to the current second expected receiving sequence number, it indicates that the current MAC PDU is not a repeated data packet, the current second expected receiving sequence number is increased by 1, and an expected receiving sequence number obtained by increasing the current second expected receiving sequence number by 1 is returned to the MAC entity of the sending device. If decoding succeeds, and the current second expected receiving sequence number is not equal to the second sending sequence number of the current MAC PDU, it indicates that the current MAC PDU is a repeated data packet, the current MAC PDU is discarded, the current second expected receiving sequence number remains unchanged, and the second expected receiving sequence number is returned to the MAC entity of the sending device. If decoding fails, or the MAC entity of the receiving device does not receive, within preset duration, the MAC PDU sent by the MAC entity of the sending device, the current second expected receiving sequence number remains unchanged, and the current expected receiving sequence number is returned to the MAC entity of the sending device.

A processing process of the MAC entity of the sending device is as follows: The MAC entity of the sending device receives the second expected receiving sequence number returned by the MAC entity of the receiving device, and compares a value of the returned second expected receiving sequence number with a value of a second sending sequence number of a next MAC PDU. If the value of the returned second expected receiving sequence number is equal to the value of the second sending sequence number, it indicates that the current MAC PDU is successfully transmitted, and the MAC entity of the sending device sends the next MAC PDU. If the value of the returned second expected receiving sequence number is not equal to the value of the second sending sequence number, it indicates that the current MAC PDU is not successfully transmitted, the MAC entity of the sending device retransmits the current MAC PDU, and if a scheduled resource is greater than the MAC PDU that needs to be retransmitted, directly retransmits the MAC PDU, or if a scheduled resource is not greater than the MAC PDU that needs to be retransmitted, instructs the RLC entity to perform re-segmentation, and retransmits the MAC PDU at a plurality of times. If the MAC entity of the sending device does not receive, within preset duration, the second expected receiving sequence number returned by the MAC entity of the receiving device, after a timer expires, the MAC entity of the sending device enters a sleep state, and after preset sleep time ends, the MAC entity of the sending device re-establishes a data connection to the MAC entity of the receiving device.

Optionally, quantities of bits of the second sending sequence number and the second expected receiving sequence number are 1, and initial values are equal.

Values of the first sending sequence number, the second sending sequence number, and the second expected receiving sequence number are 0 or 1.

The following uses a specific embodiment to describe the data sending method according to this embodiment of the present invention. The RLC entity of the receiving device performs repetition detection, and the MAC entity of the receiving device performs error detection. An initial value of the first sending sequence number maintained by the RLC entity of the sending device is 0, that is, a first sending sequence number of a current RLC PDU that is to be sent by the RLC entity of the sending device is 0. An initial value of the first expected receiving sequence number maintained by the RLC entity of the receiving device is 0. The RLC entity of the sending device sends the current RLC PDU to the RLC entity of the receiving device. The RLC entity of the receiving device obtains the first sending sequence number (0) of the current RLC PDU, and obtains the current first expected receiving sequence number (0). It is found, by means of comparison, that the value of the first sending sequence number is equal to the value of the first expected receiving sequence number. Therefore, it indicates that the current RLC PDU is not a repeated data packet, the first expected receiving sequence number is increased by 1 (a value obtained after the first expected receiving sequence number is increased by 1 is 1), and a first expected receiving sequence number obtained by increasing the current first expected receiving sequence number by 1 is returned to the RLC entity of the sending device.

The MAC entity of the receiving device may perform both error detection and repetition detection. For a specific detection process, refer to the description in the first method embodiment.

Figure 5:
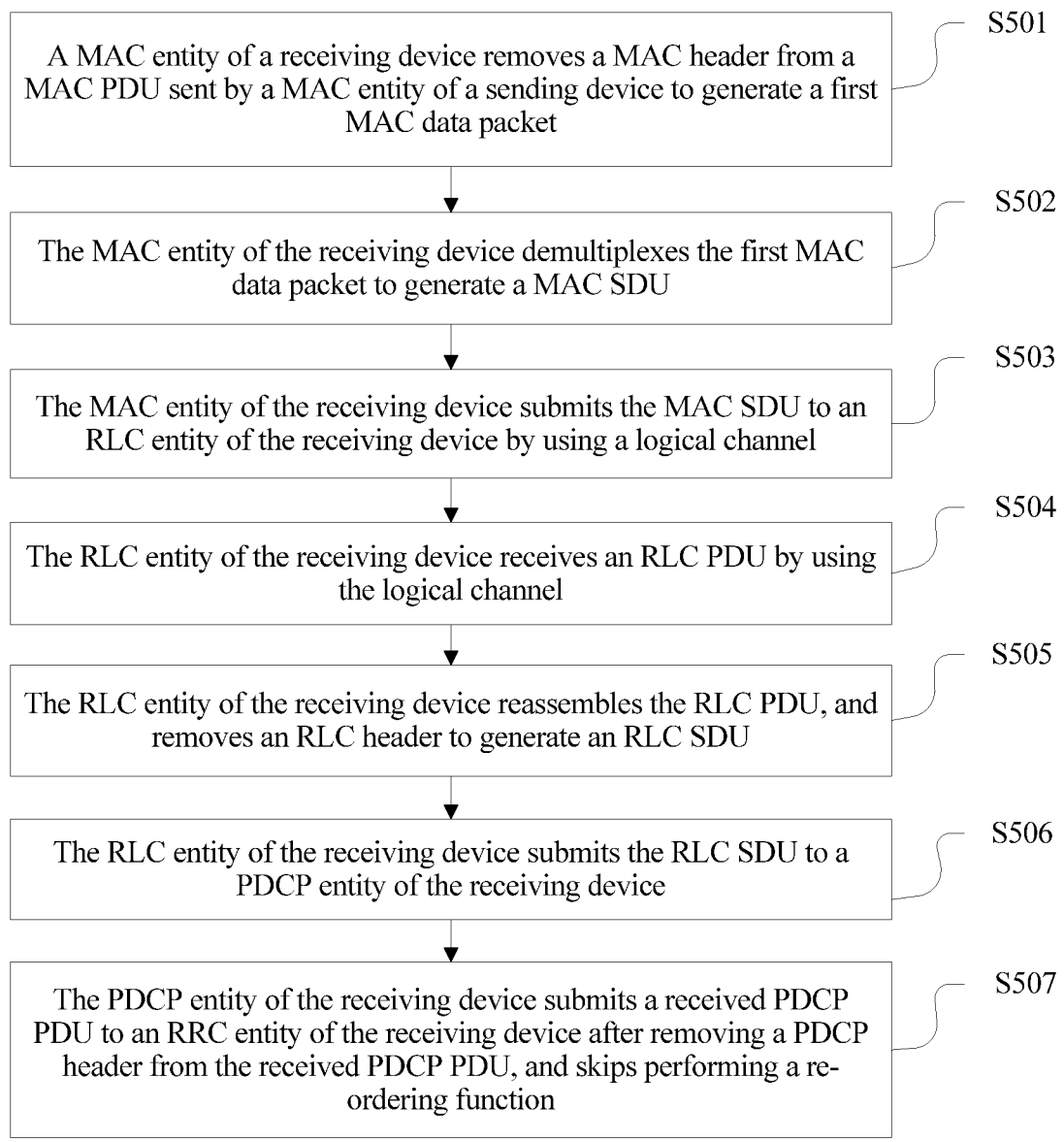
FIG. 5 is a second schematic diagram of a data receiving method according to an embodiment of the present invention.

Referring to FIG. 5, FIG. 5 is a schematic flowchart of a data receiving method according to an embodiment of the present invention. In this embodiment of the present invention, the method includes the following steps.

S501. A MAC entity of a receiving device removes a MAC header from a MAC PDU sent by a MAC entity of a sending device to generate a first MAC data packet.

Specifically, the receiving device includes an RRC entity, a PDCP entity, an RLC entity, the MAC entity, and a physical entity of the receiving device. The RRC entity of the receiving device is located at an RRC layer, the PDCP entity of the receiving device is located at a PDCP layer, the RLC entity of the receiving device is located at an RLC layer, the MAC entity of the receiving device is located at a MAC layer, and the physical entity of the receiving device is located at a physical layer. A channel between the RLC layer and the MAC layer is a logical channel, and a channel between the MAC layer and the physical layer is a transmission channel. The MAC entity of the sending device transmits the MAC PDU to the MAC entity of the receiving device by using a physical entity of the sending device and the physical entity of the receiving device. The MAC entity of the receiving device removes the MAC header from the MAC PDU to generate the first MAC data packet.

S502. The MAC entity of the receiving device demultiplexes the first MAC data packet to generate a MAC SDU.

S503. The MAC entity of the receiving device submits the MAC SDU to an RLC entity of the receiving device by using a logical channel.

The MAC SDU becomes an RLC PDU after entering the RLC entity through the logical channel. The MAC entity of the receiving device submits generated MAC SDUs to the RLC entity of the receiving device by using logical channels.

S504. The RLC entity of the receiving device receives an RLC PDU by using the logical channel.

S505. The RLC entity of the receiving device reassembles the RCL PDU, and removes an RLC header to generate an RLC SDU.

S506. The RLC entity submits the RLC SDU to a PDCP entity of the receiving device.

S507. The PDCP entity of the receiving device submits a received PDCP PDU to an RRC entity of the receiving device after removing a PDCP header from the received PDCP PDU, and skips performing a re-ordering function.

Optionally, before the MAC entity of the receiving device removes the MAC header from the MAC PDU sent by the MAC entity of the sending device to generate the first MAC data packet, the method further includes:

the MAC entity of the receiving device decodes the MAC PDU; and if decoding is correct, the MAC entity of the receiving device removes the MAC header from the MAC PDU sent by the MAC entity of the sending device to generate the first MAC data packet.

After the MAC entity of the receiving device submits the MAC SDU to the RLC entity of the receiving device by using the logical channel, the method further includes:

determining, by the RLC entity of the receiving device, whether a current first expected receiving sequence number is equal to a first sending sequence number of the RLC PDU; and if the current first expected receiving sequence number is equal to the first sending sequence number of the RLC PDU, which indicates that the RLC PDU is not a repeated data packet, increasing the current first expected receiving sequence number by 1.

Optionally, if the RLC entity of the receiving device determines that the current first expected receiving sequence number is not equal to the first sending sequence number of the RLC PDU, it indicates that the RLC PDU is a repeated data packet, the RLC PDU is discarded, and the current first expected receiving sequence number remains unchanged.

Alternatively, if the RLC entity of the receiving device determines that the current first expected receiving sequence number is less than the first sending sequence number of the RLC PDU, it indicates that an RLC PDU is lost, and the RLC entity of the receiving device instructs an RCL entity of the sending device to retransmit the lost RLC PDU.

The MAC entity of the receiving device decodes the MAC PDU sent by the MAC entity of the sending device, and if decoding succeeds, returns an ACK to the MAC entity of the sending device, or if decoding fails, returns a NACK to the MAC entity of the sending device. If decoding succeeds, the MAC entity of the receiving device demultiplexes the MAC PDU and removes the MAC header from the MAC PDU to generate the MAC SDU, and submits the MAC SDU to the RLC entity of the receiving device by using the logical channel, and the RLC entity of the receiving device receives the RLC PDU. The RLC entity of the receiving device performs repetition detection on the RLC PDU, obtains the first sending sequence number of the received RLC PDU and the current first expected receiving sequence number, and determines, by means of comparison, whether the first sending sequence number is equal to the first expected receiving sequence number. If the first sending sequence number is equal to the first expected receiving sequence number, it indicates that the received RLC PDU is not a repeated data packet, and an expected receiving sequence number obtained by increasing the current first expected receiving sequence number by 1 is returned to the RLC entity of the sending device.

The RLC entity of the sending device maintains a first sending sequence number for each to-be-sent RLC PDU. The MAC entity of the receiving device maintains a first expected receiving sequence number for each received RLC PDU. The first expected receiving sequence number is a first sending sequence number of an RLC PDU that is received by the receiving MAC entity last time. Maximum values of the first sending sequence number and the first expected receiving sequence number are equal, and initial values are equal. After receiving an RLC PDU, the RLC entity of the receiving device obtains a first sending sequence number of the received RLC PDU, and obtains a stored first expected receiving sequence number, and compares a value of the first sending sequence number with a value of the first expected receiving sequence number. If the first expected receiving sequence number is less than the first sending sequence number of the received RLC PDU, it indicates that a data packet between the currently received RLC PDU and an RLC PDU that is received last time is lost, and the RLC entity of the receiving device may instruct the RLC entity of the sending device to retransmit the lost RLC PDU, or instruct the MAC entity of the receiving device to retransmit the lost RLC PDU from a buffer.

Optionally, before the MAC entity of the receiving device demultiplexes the MAC PDU sent by the MAC entity of the sending device to generate the first MAC data packet, the method further includes:

decoding, by the MAC entity of the receiving device, the MAC PDU;

if decoding succeeds, continuing to determine whether the MAC PDU is a repeated data packet; and if the MAC PDU is not a repeated data packet, demultiplexing, by the MAC entity of the receiving device, the MAC PDU sent by the MAC entity of the sending device to generate the first MAC data packet.

The MAC entity of the receiving device performs error detection and repetition detection on the MAC PDU herein. For a specific process, refer to the description in the third method embodiment. Details are not described herein.

Optionally, the method further includes:

if the MAC PDU is a repeated data packet, discarding the MAC PDU; or if a feedback message that is sent last time is a NACK, and an NDI is flipped, or an NDI indicates a newly transmitted data packet, indicating that a MAC PDU is lost; or if a feedback message that is sent last time is a NACK, and an NDI is not flipped, or an NDI indicates retransmitted data, indicating that the MAC PDU is a retransmitted data packet.

If the feedback message that is sent last time is the NACK, and the NDI (new data indicator) of the current MAC PDU is not flipped when compared with a stored NDI, or the NDI indicates a retransmitted data packet, it indicates that the current MAC PDU is a repeated data packet. If the feedback message that is sent last time is the NACK, and the NDI is not flipped, or the NDI indicates retransmitted data, it indicates that the MAC PDU is a repeated data packet.

Optionally, the determining whether the MAC PDU is a repeated data packet includes:

if a feedback message that is sent last time is an ACK, and an NDI is flipped, or an NDI indicates a newly transmitted data packet, indicating that the MAC PDU is not a repeated data packet; or if a feedback message that is sent last time is an ACK, and an NDI is not flipped, or an NDI indicates retransmitted data, indicating that the MAC PDU is a repeated data packet.

That an NDI is flipped means that the NDI changes from 0 to 1 or from 1 to 0, and that an NDI is not flipped means that the NDI is 0 or 1 and remains unchanged. That an NDI indicates a newly transmitted data packet or a retransmitted data packet may be indicated by using a fixed value. For example, when NDI=1, the NDI indicates a newly transmitted data packet, and when NDI=0, the NDI indicates a retransmitted data packet. A method for determining whether the MAC PDU is a repeated data packet may be as follows: The MAC entity of the receiving device receives the current MAC PDU, and obtains a type of the feedback message that is sent by the MAC entity of the receiving device to the MAC entity of the sending device last time. If the feedback message that is sent last time is the ACK, and the NDI of the current MAC PDU is flipped when compared with a stored NDI, or the NDI indicates a newly transmitted data packet, it indicates that the current MAC PDU is not a repeated data packet.

Optionally, before the MAC entity of the receiving device demultiplexes the MAC PDU sent by the MAC entity of the sending device to generate the first MAC data packet, the method further includes:

decoding, by the MAC entity of the receiving device, the MAC PDU;

if decoding succeeds, obtaining, by the MAC entity of the receiving device, a second sending sequence number of the MAC PDU;

determining, by the MAC entity of the receiving device, whether a current second expected receiving sequence number is equal to the second sending sequence number of the MAC PDU; and if the current second expected receiving sequence number is equal to the second sending sequence number of the MAC PDU, which indicates that the MAC PDU is not a repeated data packet, keeping the current second expected receiving sequence number unchanged, and returning the current second expected receiving sequence number to the MAC entity of the sending device.

The MAC entity of the receiving device performs error detection and repetition detection on the received MAC PDU. For a specific principle, refer to the description in the second method embodiment. Details are not described herein.

Optionally, the method further includes:

if the MAC entity of the receiving device determines that the current second expected receiving sequence number is not equal to the second sending sequence number of the MAC PDU, which indicates that the MAC PDU is a repeated data packet, returning an expected receiving sequence number obtained by increasing the current second expected receiving sequence number by 1 to the MAC entity of the sending device; or if decoding fails, or a data packet returned by the MAC entity of the sending device is not received within preset duration, keeping, by the MAC entity of the receiving device, the current receiving sequence number unchanged, and returning the current second expected receiving sequence number to the MAC entity of the sending device.

During implementation of this embodiment of the present invention, functions of the RLC layer and the MAC layer of LTE protocol layers are simplified, to reduce device implementation difficulty, reduce device costs, and reduce sending of device signaling to save a signaling resource.

Figure 6:
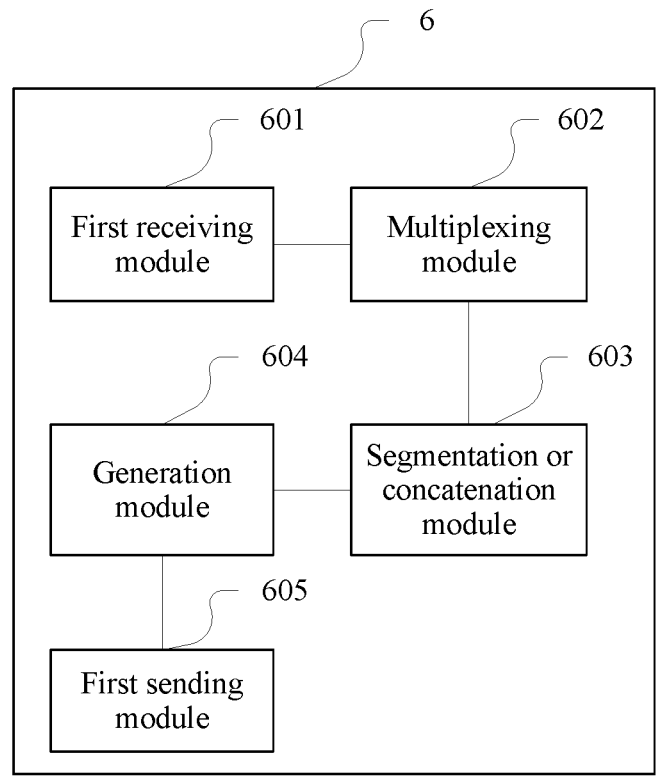
FIG. 6 is a first schematic structural diagram of a sending device according to an embodiment of the present invention.

Referring to FIG. 6, FIG. 6 is a schematic structural diagram of a sending device according to an embodiment of the present invention. In this embodiment of the present invention, the sending device includes a MAC entity. The MAC entity of the sending device is configured to perform the method shown in FIG. 2. The MAC entity of the sending device includes a first receiving module 601, a segmentation or concatenation module 602, a multiplexing module 603, a generation module 604, and a first sending module 605.

The first receiving module 601 is configured to receive a MAC SDU sent by a PDCP entity of the sending device by using a logical channel.

The multiplexing module 602 is configured to multiplex the MAC SDU received by the first receiving module to generate a first MAC data packet.

The segmentation or concatenation module 603 is configured to segment or concatenate the first MAC data packet generated by the multiplexing module to generate a second MAC data packet.

The generation module 604 is configured to add a MAC header to the second MAC data packet generated by the segmentation or concatenation module to generate a MAC PDU.

The first sending module 605 is configured to send the MAC PDU generated by the generation module to a MAC entity of a receiving device by using a physical entity of the sending device and a physical entity of the receiving device.

Optionally, the generation module is configured to:

add, to the second MAC data packet generated by the segmentation or concatenation module, a MAC header that carries a sending sequence number, to generate the MAC PDU; and the MAC entity of the sending device further includes:

a second receiving module, configured to receive an expected receiving sequence number returned by the MAC entity of the receiving device according to the MAC PDU;

a determining module, configured to determine whether the expected receiving sequence number received by the second receiving module is equal to a sending sequence number of a next MAC PDU; and a second sending module, configured to: if a determining result of the determining module is that the expected receiving sequence number is equal to the sending sequence number of the next MAC PDU, which indicates that the MAC PDU is correctly transmitted, send the next MAC PDU to the MAC entity of the receiving device; or a retransmission module, configured to: if a determining result of the determining module is that the expected receiving sequence number is not equal to the sending sequence number of the next MAC PDU, which indicates that the MAC PDU is incorrectly transmitted, retransmit the MAC PDU.

Optionally, the retransmission module is configured to:

extract the MAC PDU from a buffer, and reschedule a transmission resource for the MAC PDU; and if the rescheduled transmission resource meets a condition of transmitting the MAC PDU at a time, retransmit the MAC PDU to the MAC entity of the receiving device; or if the rescheduled transmission resource does not meet a condition of transmitting the MAC PDU at a time, re-segment the MAC PDU before retransmission.

Optionally, the MAC entity of the sending device further includes:

a sleep module, configured to: if an expected receiving sequence number returned by the MAC entity of the receiving device according to the MAC PDU is not received within preset duration, enable the MAC entity of the sending device to enter a sleep state; and when preset sleep duration expires, re-establish a connection to the MAC entity of the receiving device.

Optionally, initial values of the sending sequence number and the expected receiving sequence number are equal, and both quantities of bits are 1.

Optionally, the MAC entity of the sending device further includes:

a scheduling module, configured to: obtain a priority of the logical channel, and allocate a transmission resource to the MAC SDU according to the priority of the logical channel.

This embodiment of the present invention and the data sending method in the first method embodiment are based on a same concept, and technical effects brought by this embodiment of the present invention are also the same as those brought by the first method embodiment. For a specific process, refer to the description in the first method embodiment. Details are not described herein.

Figure 7:
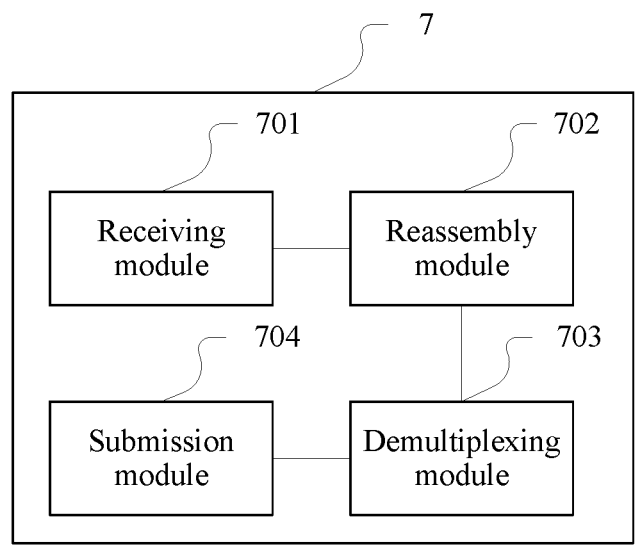
FIG. 7 is a first schematic structural diagram of a receiving device according to an embodiment of the present invention.

Referring to FIG. 7, FIG. 7 is a schematic structural diagram of a receiving device according to an embodiment of the present invention. In this embodiment of the present invention, the receiving device includes a MAC entity. The MAC entity of the receiving device is configured to perform the method shown in FIG. 3. The MAC entity of the receiving device includes a receiving module 701, a reassembly module 702, a demultiplexing module 703, and a submission module 704.

The receiving module 701 is configured to receive, by using a physical entity of a sending device and a physical entity of the receiving device, a MAC PDU sent by a MAC entity of the sending device.

The reassembly module 702 is configured to: remove a MAC header from the MAC PDU sent by the receiving module, and reassemble the MAC PDU to generate a third MAC data packet.

The demultiplexing module 703 is configured to demultiplex the third MAC data packet generated by the reassembly module to generate a MAC SDU.

The submission module 704 is configured to submit the MAC SDU generated by the demultiplexing module to a PDCP entity of the receiving device by using a logical channel.

Optionally, the MAC entity of the receiving device further includes:

a decoding module, configured to decode the MAC PDU;

a determining module, configured to: if decoding performed by the decoding module succeeds, continue to determine whether a current expected receiving sequence number is equal to a sending sequence number of the MAC PDU; and a first returning module, configured to: if a determining result of the determining module is that the current expected receiving sequence number is equal to the sending sequence number of the MAC PDU, which indicates that the MAC PDU is not a repeated data packet, return an expected receiving sequence number obtained by increasing the current expected receiving sequence number by 1 to the MAC entity of the sending device.

Optionally, the MAC entity of the receiving device further includes:

a second returning module, configured to: if a determining result of the determining module is that the current expected receiving sequence number is not equal to the sending sequence number of the MAC PDU, and when compared with a stored sending sequence number that is received last time, the sending sequence number of the MAC PDU is not flipped but is expected to be flipped, which indicates that the MAC PDU is a repeated data packet, keep the current receiving sequence number unchanged, and return the current receiving sequence number to the MAC entity of the sending device; or a third returning module, configured to: if a determining result of the determining module is that the current expected receiving sequence number is not equal to the sending sequence number of the MAC PDU, and when compared with a stored sending sequence number that is received last time, the sending sequence number of the MAC PDU is flipped but is not expected to be flipped, which indicates that a MAC PDU is lost, keep the current receiving sequence number unchanged, and return the current receiving sequence number to the MAC entity of the sending device; or a fourth returning module, configured to: if decoding fails, or a data packet sent by the MAC entity of the sending device is not received within preset duration, keep the current expected receiving sequence number unchanged, and return the current expected receiving sequence number to the MAC entity of the sending device.

Optionally, initial values of the sending sequence number and the expected receiving sequence number are equal, and both quantities of bits are 1.

This embodiment of the present invention and the data receiving method in the second method embodiment are based on a same concept, and technical effects brought by this embodiment of the present invention are also the same as those brought by the second method embodiment. For a specific process, refer to the description in the second method embodiment. Details are not described herein.

Figure 8:
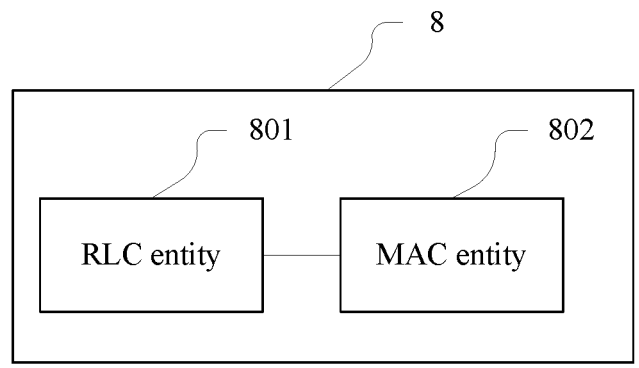
FIG. 8 is a second schematic structural diagram of a sending device according to an embodiment of the present invention.

Referring to FIG. 8, FIG. 8 shows a sending device according to an embodiment of the present invention. In this embodiment of the present invention, the sending device is configured to perform the method shown in FIG. 4. The sending device includes an RLC entity 801 and a MAC entity 802. A transmission mode of the RLC entity of the sending device is a transparent transmission mode and unacknowledged mode.

The RLC entity 801 of the sending device is configured to: receive an RLC SDU sent by a PDCP entity of the sending device, where the transmission mode of the RLC entity of the sending device is the transparent transmission mode and the unacknowledged mode;

segment or concatenate the RLC SDU, and add an RLC header to generate an RLC PDU; and send the RLC PDU to the MAC entity of the sending device by using a logical channel.

The MAC entity 802 of the sending device is configured to: receive, by using the logical channel, a MAC SDU sent by the RLC entity of the sending device;

obtain a priority of the logical channel, and allocate a transmission resource to the MAC SDU according to the priority of the logical channel;

multiplex the MAC SDU, and add a MAC header to generate a MAC PDU; and send the MAC PDU to a MAC entity of a receiving device by using a physical entity of the sending device and a physical entity of the receiving device.

Optionally, that the RLC entity of the sending device segments or concatenates the RLC SDU, and adds an RLC header to generate an RLC PDU includes:

segmenting or concatenating the RLC SDU, and adding an RLC header that carries a first sending sequence number to generate the RLC PDU; and the MAC entity of the sending device is further configured to:

if the MAC entity of the sending device receives an ACK returned by the MAC entity of the receiving device according to the MAC PDU, send a next MAC PDU to the MAC entity of the sending device; or if the MAC entity of the sending device receives a NACK returned by the MAC entity of the receiving device according to the MAC PDU, retransmit the MAC PDU to the MAC entity of the sending device.

Optionally, that the MAC entity of the sending device retransmits the MAC PDU to the MAC entity of the sending device includes:

rescheduling a transmission resource for the MAC PDU; and if the rescheduled transmission resource meets a condition of transmitting the MAC PDU at a time, retransmitting the MAC PDU to the MAC entity of the receiving device; or if the rescheduled transmission resource does not meet a condition of transmitting the MAC PDU at a time, instructing the RLC entity of the sending device to extract the RLC PDU corresponding to the MAC PDU from a buffer, and re-segmenting the RLC PDU; and generating a plurality of corresponding MAC PDUs according to the re-segmented RLC PDU, and sequentially retransmitting the plurality of MAC PDUs.

Optionally, that the MAC entity of the sending device multiplexes the MAC SDU, and adds a MAC header to generate a MAC PDU further includes:

multiplexing the MAC SDU, and adding a MAC header that carries a second sending sequence number to generate the MAC PDU; and the MAC entity of the sending device is further configured to:

receive a second expected receiving sequence number returned by the MAC entity of the receiving device according to the MAC PDU;

determine whether the second expected receiving sequence number is equal to a second sending sequence number of a next MAC PDU; and if the second expected receiving sequence number is equal to the sending sequence number of the next MAC PDU, which indicates that the MAC PDU is correctly transmitted, send the next MAC PDU to the MAC entity of the receiving device; or if the second expected receiving sequence number is not equal to the sending sequence number of the next MAC PDU, which indicates that the MAC PDU is incorrectly transmitted, retransmit the MAC PDU.

Optionally, quantities of bits of the second sending sequence number and the second expected receiving sequence number are 1, and initial values are equal.

This embodiment of the present invention and the third method embodiment are based on a same concept, and technical effects brought by this embodiment of the present invention are also the same as those brought by the third method embodiment. For a specific process, refer to the description in the third method embodiment. Details are not described herein.

Figure 9:
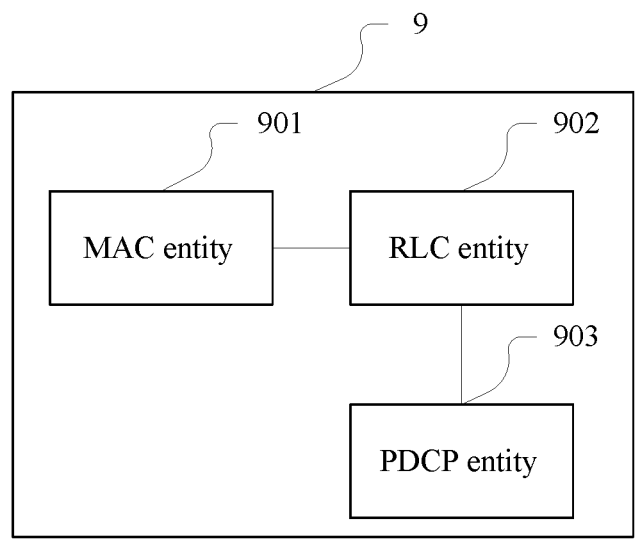
FIG. 9 is a second schematic structural diagram of a receiving device according to an embodiment of the present invention.

Referring to FIG. 9, FIG. 9 shows a receiving device according to an embodiment of the present invention. In this embodiment of the present invention, the receiving device is configured to perform the method shown in FIG. 5. The receiving device includes a MAC entity 901, an RLC entity 902, and a PDCP entity 903.

The MAC entity 901 of the receiving device is configured to: remove a MAC header from a MAC PDU sent by a MAC entity of a sending device to generate a first MAC data packet;

demultiplex the first MAC data packet to generate a MAC SDU; and submit the MAC SDU to the RLC entity of the receiving device by using a logical channel.

The RLC entity 902 of the receiving device is configured to: receive, by using the logical channel, an RLC PDU sent by the MAC entity of the receiving device;

reassemble the RCL PDU, and remove an RLC header to generate an RLC SDU;

and submit the RLC SDU to the PDCP entity of the receiving device.

The PDCP entity 903 of the receiving device is configured to: submit a received PDCP PDU to an RRC entity of the receiving device after removing a PDCP header from the received PDCP PDU, and skip performing a re-ordering function.

Optionally, before removing the MAC header from the MAC PDU sent by the MAC entity of the sending device to generate the first MAC data packet, the MAC entity of the receiving device is further configured to:

decode the MAC PDU; and if decoding is correct, demultiplex the MAC PDU sent by the MAC entity of the sending device to generate the first MAC data packet; and after submitting the MAC SDU to the RLC entity of the receiving device by using the logical channel, the RLC entity of the receiving device is further configured to:

determine whether a current first expected receiving sequence number is equal to a first sending sequence number of the RLC PDU; and if the current first expected receiving sequence number is equal to the first sending sequence number of the RLC PDU, which indicates that the RLC PDU is not a repeated data packet, increase the current first expected receiving sequence number by 1.

Optionally, the RLC entity of the receiving device is further configured to:

if determining that the current first expected receiving sequence number is not equal to the first sending sequence number of the RLC PDU, which indicates that the RLC PDU is a repeated data packet, discard the RLC PDU, and keep the current first expected receiving sequence number unchanged; or if determining that the current first expected receiving sequence number is less than the first sending sequence number of the RLC PDU, which indicates that an RLC PDU is lost, instruct an RCL entity of the sending device to retransmit the lost RLC PDU.

Optionally, before demultiplexing the MAC PDU sent by the MAC entity of the sending device to generate the first MAC data packet, the MAC entity of the receiving device is further configured to:

decode the MAC PDU;

if decoding succeeds, continue to determine whether the MAC PDU is a repeated data packet; and if the MAC PDU is not a repeated data packet, demultiplex the MAC PDU sent by the MAC entity of the sending device to generate the first MAC data packet.

Optionally, the MAC entity of the receiving device is further configured to:

if the MAC PDU is a repeated data packet, discard the MAC PDU; or if a feedback message that is sent last time is a NACK, and an NDI is flipped, or an NDI indicates a newly transmitted data packet, indicate that a MAC PDU is lost; or if a feedback message that is sent last time is a NACK, and an NDI is not flipped, or an NDI indicates retransmitted data, indicate that the MAC PDU is a retransmitted data packet.

Optionally, that the receiver determines whether the MAC PDU is a repeated data packet includes:

if a feedback message that is sent last time is an ACK, and an NDI is flipped, or an NDI indicates a newly transmitted data packet, indicating that the MAC PDU is not a repeated data packet; or if a feedback message that is sent last time is an ACK, and an NDI is not flipped, or an NDI indicates retransmitted data, indicating that the MAC PDU is a repeated data packet.

Optionally, before demultiplexing the MAC PDU sent by the MAC entity of the sending device to generate the first MAC data packet, the MAC entity of the receiving device is further configured to:

decode the MAC PDU;

if decoding succeeds, obtain a second sending sequence number of the MAC PDU;

determine whether a current second expected receiving sequence number is equal to the second sending sequence number of the MAC PDU; and if the current second expected receiving sequence number is equal to the second sending sequence number of the MAC PDU, which indicates that the MAC PDU is not a repeated data packet, keep the current second expected receiving sequence number unchanged, and return the current second expected receiving sequence number to the MAC entity of the sending device.

Optionally, the MAC entity of the receiving device is further configured to:

if determining that the current second expected receiving sequence number is not equal to the second sending sequence number of the MAC PDU, which indicates that the MAC PDU is a repeated data packet, return an expected receiving sequence number obtained by increasing the current second expected receiving sequence number by 1 to the MAC entity of the sending device; or if decoding fails, or a data packet returned by the MAC entity of the sending device is not received within preset duration, keep the current receiving sequence number unchanged, and return the current second expected receiving sequence number to the MAC entity of the sending device.

This embodiment of the present invention and the data receiving method in the fourth method embodiment are based on a same concept, and technical effects brought by this embodiment of the present invention are also the same as those brought by the fourth method embodiment. For a specific process, refer to the description in the fourth method embodiment. Details are not described herein.

Figure 10:
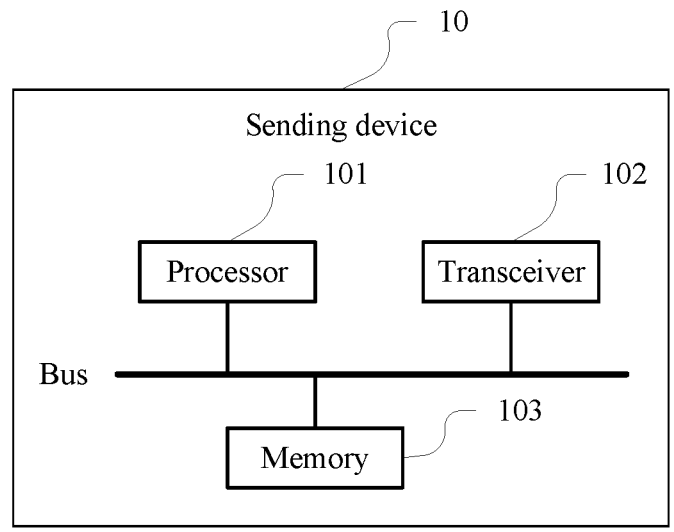
FIG. 10 is a third schematic structural diagram of a sending device according to an embodiment of the present invention.

Referring to FIG. 10, FIG. 10 is a schematic structural diagram of a sending device according to a third embodiment of the present invention. In this embodiment of the present invention, the sending device 10 includes a processor 101, a memory 103, and a transceiver 102. The transceiver 102 is configured to communicate with an external device by using a communications interface. There may be one or more processors in the sending device 10. In some embodiments of the present invention, the processor 101, the memory 103, and the transceiver 102 may be connected by using a bus or in other manners.

The processor 101 may be configured to perform the method shown in FIG. 2. The processor 101 includes a MAC entity. The MAC entity includes a first receiving module, a multiplexing module, a segmentation or concatenation module, a generation module, and a first sending module.

The first receiving module is configured to receive a MAC SDU sent by a PDCP entity of the sending device by using a logical channel.

The multiplexing module is configured to multiplex the MAC SDU received by the first receiving module to generate a first MAC data packet.

The segmentation or concatenation module is configured to segment or concatenate the first MAC data packet generated by the multiplexing module to generate a second MAC data packet.

The generation module is configured to add a MAC header to the second MAC data packet generated by the segmentation or concatenation module to generate a MAC PDU.

The first sending module is configured to send the MAC PDU generated by the generation module to a MAC entity of a receiving device by using a physical entity of the sending device and a physical entity of the receiving device.

For meanings and examples of the terms in this embodiment, refer to the embodiment corresponding to FIG. 2. Details are not described herein.

Figure 11:
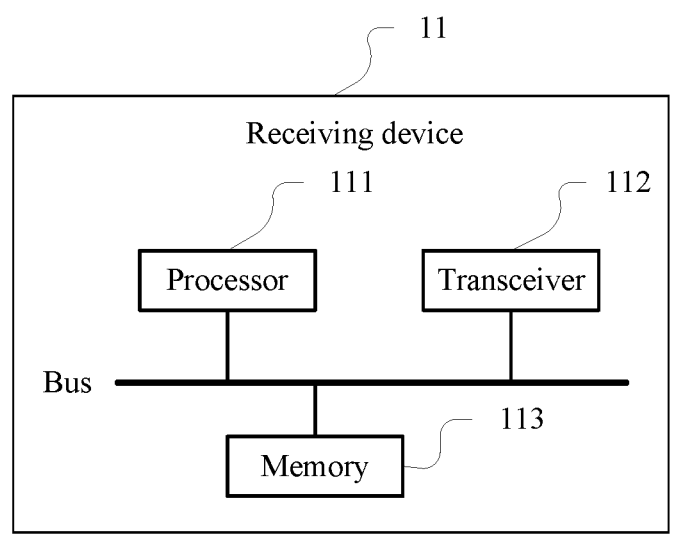
FIG. 11 is a third schematic structural diagram of a receiving device according to an embodiment of the present invention.

Referring to FIG. 11, FIG. 11 is a schematic structural diagram of a receiving device according to a third embodiment of the present invention. In this embodiment of the present invention, the receiving device 11 includes a processor 111, a memory 113, and a transceiver 112. The transceiver 112 is configured to communicate with an external device by using a communications interface. There may be one or more processors in the receiving device 11. In some embodiments of the present invention, the processor 111, the memory 113, and the transceiver 112 may be connected by using a bus or in other manners.

The processor 111 may be configured to perform the method shown in FIG. 3. The processor 111 includes a MAC entity. The MAC entity includes a receiving module, a reassembly module, a demultiplexing module, and a submission module.

The receiving module is configured to receive, by using a physical entity of a sending device and a physical entity of the receiving device, a MAC PDU sent by a MAC entity of the sending device.

The reassembly module is configured to: remove a MAC header from the MAC PDU sent by the receiving module, and reassemble the MAC PDU to generate a third MAC data packet.

The demultiplexing module is configured to demultiplex the third MAC data packet generated by the reassembly module to generate a MAC SDU.

The submission module is configured to submit the MAC SDU generated by the demultiplexing module to a PDCP entity of the receiving device by using a logical channel.

The processor 111 may be configured to perform the method shown in FIG. 3. For meanings and examples of the terms in this embodiment, refer to the embodiment corresponding to FIG. 3. Details are not described herein.

Figure 12:
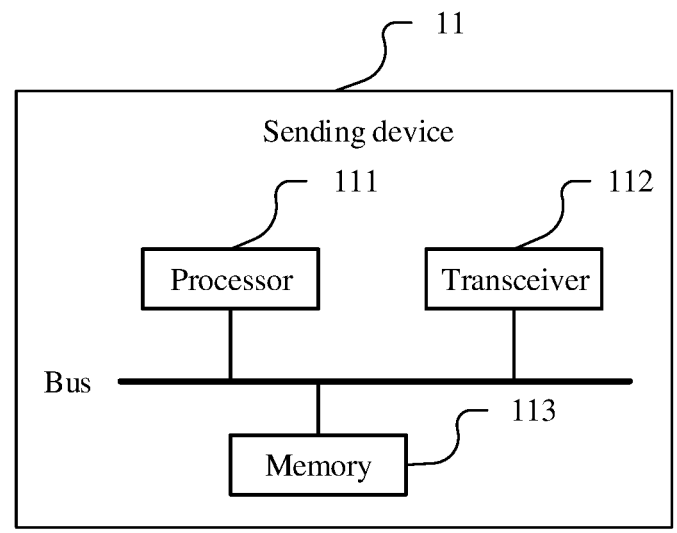
FIG. 12 is a fourth schematic structural diagram of a sending device according to an embodiment of the present invention.

Referring to FIG. 12, FIG. 12 is a schematic structural diagram of a sending device according to a fourth embodiment of the present invention. In this embodiment of the present invention, the sending device 12 includes a processor 121, a memory 123, and a transceiver 122. The transceiver 122 is configured to communicate with an external device by using a communications interface. There may be one or more processors in the sending device 12. In some embodiments of the present invention, the processor 121, the memory 123, and the transceiver 122 may be connected by using a bus or in other manners.

The processor 121 may be configured to perform the method shown in FIG. 4. The processor 121 includes an RLC entity and a MAC entity.

The RLC entity of the sending device is configured to: receive an RLC SDU sent by a PDCP entity of the sending device, where a transmission mode of the RLC entity of the sending device is a transparent transmission mode and an unacknowledged mode;

segment or concatenate the RLC SDU, and add an RLC header to generate an RLC PDU; and send the RLC PDU to the MAC entity of the sending device by using a logical channel.

The MAC entity of the sending device is configured to: receive, by using the logical channel, a MAC SDU sent by the RLC entity of the sending device;

obtain a priority of the logical channel, and allocate a transmission resource to the MAC SDU according to the priority of the logical channel;

multiplex the MAC SDU, and add a MAC header to generate a MAC PDU; and send the MAC PDU to a MAC entity of a receiving device by using a physical entity of the sending device and a physical entity of the receiving device.

For meanings and examples of the terms in this embodiment, refer to the embodiment corresponding to FIG. 4. Details are not described herein.

Figure 13:
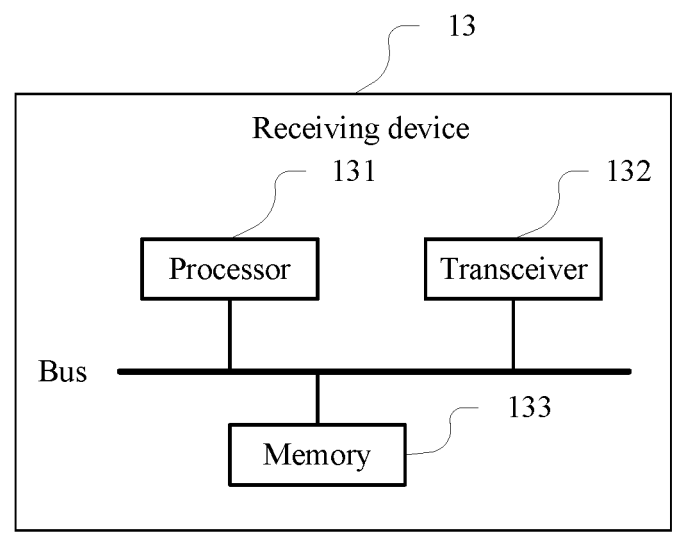
FIG. 13 is a fourth schematic structural diagram of a receiving device according to an embodiment of the present invention.

Referring to FIG. 13, FIG. 13 is a schematic structural diagram of a receiving device according to a fourth embodiment of the present invention. In this embodiment of the present invention, the receiving device 13 includes a processor 131, a memory 133, and a transceiver 132. The transceiver 132 is configured to communicate with an external device by using a communications interface. There may be one or more processors in the receiving device 13. In some embodiments of the present invention, the processor 131, the memory 133, and the transceiver 132 may be connected by using a bus or in other manners.

The processor 131 may be configured to perform the method shown in FIG. 5. The processor 131 includes a MAC entity, an RLC entity, and a PDCP entity.

The MAC entity of the receiving device is configured to: remove a MAC header from a MAC PDU sent by a MAC entity of a sending device to generate a first MAC data packet;

demultiplex the first MAC data packet to generate a MAC SDU; and submit the MAC SDU to the RLC entity of the receiving device by using a logical channel.

The RLC entity of the receiving device is configured to: receive, by using the logical channel, an RLC PDU sent by the MAC entity of the receiving device;

reassemble the RCL PDU, and remove an RLC header to generate an RLC SDU; and submit the RLC SDU to the PDCP entity of the receiving device.

The PDCP entity of the receiving device is configured to: submit a received PDCP PDU to an RRC entity of the receiving device after removing a PDCP header from the received PDCP PDU, and skip performing a re-ordering function.

For meanings and examples of the terms in this embodiment, refer to the embodiment corresponding to FIG. 5. Details are not described herein.

Finally, in the technical solutions provided in the foregoing embodiments, the LTE network standard is merely used as an example. The solutions provided in the embodiments of the present invention also support another wireless cellular network standard. Persons skilled in the art may implement the data receiving method and the data sending method of various cellular communications standards based on the technical solutions provided in the embodiments of the present invention without creative efforts.

In the several embodiments provided in the present invention, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

It may be clearly understood by persons skilled in the art that, for the purpose of convenient and brief description, division of the foregoing function modules is taken as an example for illustration. In actual application, the foregoing functions can be allocated to different function modules and implemented according to a requirement, that is, an inner structure of an apparatus is divided into different function modules to implement all or part of the functions described above. For a detailed working process of the foregoing apparatus, refer to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data sending method, comprising:
receiving, by a Media Access Control (MAC) entity of a sending device, a Media Access Control service data unit (MAC SDU) sent by a Packet Data Convergence Protocol (PDCP) entity of the sending device by using a logical channel;
multiplexing, by the MAC entity of the sending device, the MAC SDU to generate a first MAC data packet;
segmenting or concatenating, by the MAC entity of the sending device, the first MAC data packet to generate a second MAC data packet;
adding, by the MAC entity of the sending device, a MAC header to the second MAC data packet to generate a Media Access Control protocol data unit (MAC PDU), the MAC header comprising a sending sequence number; and
sending, by the MAC entity of the sending device, the MAC PDU to a MAC entity of a receiving device by using a physical entity of the sending device and a physical entity of the receiving device;
receiving, by the MAC entity of the sending device, an expected receiving sequence number returned by the MAC entity of the receiving device; and
determining whether the returned expected receiving sequence number is equal to a sending sequence number of a next MAC PDU to be sent by the MAC entity of the sending device,
wherein the sending sequence number indicates a count of MAC PDUs sent by the MAC entity of the sending device, and
wherein the expected receiving sequence number indicates a count of MAC PDUs received by the MAC entity at the receiving device.

2. The method according to claim 1,
wherein the method further comprises:
in response to the returned expected receiving sequence number being equal to the sending sequence number of the next MAC PDU, which indicates that the MAC PDU is correctly transmitted, sending, by the MAC entity of the sending device, the next MAC PDU to the MAC entity of the receiving device; or
in response to the returned expected receiving sequence number not being equal to the sending sequence number of the next MAC PDU, which indicates that the MAC PDU is incorrectly transmitted, retransmitting, by the MAC entity of the sending device, the MAC PDU.

3. The method according to claim 2, wherein an initial sending sequence number value and an initial expected receiving sequence number value are equal, and both quantities of bits are 1.

4. The method according to claim 2, wherein the retransmitting, by the MAC entity of the sending device, the MAC PDU comprises:
extracting, by the MAC entity of the sending device, the MAC PDU from a buffer, and rescheduling a transmission resource for the MAC PDU; and
in response to the rescheduled transmission resource meeting a condition of transmitting the MAC PDU at a time, retransmitting the MAC PDU to the MAC entity of the receiving device; or
in response to the rescheduled transmission resource not meeting the condition of transmitting the MAC PDU at the time, re-segmenting the MAC PDU before retransmission.

5. The method according to claim 1, further comprising:
in response to the MAC entity of the sending device not receiving, within a preset duration, an expected receiving sequence number returned by the MAC entity of the receiving device according to the MAC PDU, entering, by the MAC entity of the sending device, a sleep state; and
in response to a preset sleep duration expiring, re-establishing, by the MAC entity of the sending device, a connection to the MAC entity of the receiving device.

6. The method according to claim 1, further comprising:
obtaining a priority of the logical channel, and allocating a transmission resource to the MAC SDU according to the priority of the logical channel.

7. A data receiving method, comprising:
receiving, by a Media Access Control (MAC) entity of a receiving device by using a physical entity of a sending device and a physical entity of the receiving device, a Media Access Control protocol data unit (MAC PDU) sent by a MAC entity of the sending device;
removing, by the MAC entity of the receiving device, a MAC header from the MAC PDU, and reassembling the MAC PDU to generate a MAC data packet;
demultiplexing, by the MAC entity of the receiving device, the MAC data packet to generate a Media Access Control service data unit (MAC SDU); and
submitting, by the MAC entity of the receiving device, the MAC SDU to a Packet Data Convergence Protocol (PDCP) entity of the receiving device by using a logical channel,
wherein before the removing, by the MAC entity of the receiving device, the MAC header from the MAC PDU, and the reassembling the MAC PDU to generate the MAC data packet, the method further comprises:
decoding, by the MAC entity of the receiving device, the MAC PDU;
determining whether a current expected receiving sequence number maintained by the MAC entity of the receiving device is equal to a sending sequence number of the MAC PDU received from the MAC entity of the sending device, wherein the current expected receiving sequence number indicates a current count of MAC PDUs received from the MAC entity of the sending device and maintained by the MAC entity of the receiving device, and wherein the sending sequence number indicates a count of MAC PDUs sent and maintained by the MAC entity of the sending device; and
in response to the current expected receiving sequence number being equal to the sending sequence number of the MAC PDU received from the MAC entity of the sending device, which indicates that the MAC PDU is not a repeated data packet, returning, by the MAC entity of the receiving device, an expected receiving sequence number obtained by increasing the current expected receiving sequence number by 1 to the MAC entity of the sending device.

8. The method according to claim 7, further comprising:
in response to the current expected receiving sequence number not being equal to the sending sequence number of the MAC PDU, and when compared with a stored sending sequence number that is received last time, the sending sequence number of the MAC PDU is not flipped but is expected to be flipped, which indicates that the MAC PDU is a repeated data packet, keeping the current receiving sequence number unchanged, and returning the current receiving sequence number to the MAC entity of the sending device; or in response to the current expected receiving sequence number not being equal to the sending sequence number of the MAC PDU, and when compared with a stored sending sequence number that is received last time, the sending sequence number of the MAC PDU is flipped but is not expected to be flipped, which indicates that a MAC PDU is lost, keeping the current receiving sequence number unchanged, and returning the current receiving sequence number to the MAC entity of the sending device; or in response to decoding failing, or a data packet sent by the MAC entity of the sending device is not received within a preset duration, keeping the current expected receiving sequence number unchanged, and returning the current expected receiving sequence number to the MAC entity of the sending device.

9. The method according to claim 7, wherein an initial sending sequence number value and an initial expected receiving sequence number value are equal, and both quantities of bits are 1.

10. A sending device, comprising a Media Access Control (MAC) entity, wherein the MAC entity of the sending device comprises:
a receiver, configured to receive a Media Access Control service data unit (MAC SDU) sent by a Packet Data Convergence Protocol (PDCP) entity of the sending device by using a logical channel;
a processor, configured to:
multiplex the MAC SDU received by the receiver to generate a first MAC data packet;
segment or concatenate the first MAC data packet to generate a second MAC data packet; and
add a MAC header to the second MAC data packet to generate a Media Access Control protocol data unit (MAC PDU), the MAC header comprising a sending sequence number; and
a transmitter, configured to send the MAC PDU generated by the processor to a MAC entity of a receiving device by using a physical entity of the sending device and a physical entity of the receiving device,
wherein the receiver is further configured to receive an expected receiving sequence number returned by the MAC entity of the receiving device,
wherein the processor is further configured to determine whether the returned expected receiving sequence number is equal to a sending sequence number of a next MAC PDU to be sent by the MAC entity of the sending device,
wherein the sending sequence number indicates a count of MAC PDUs sent by the MAC entity of the sending device, and
wherein the expected receiving sequence number indicates a count of MAC PDUs received by the MAC entity at the receiving device.

11. The sending device according to claim 10, wherein
the transmitter is further configured to: in response to determining that the expected receiving sequence number is equal to the sending sequence number of the next MAC PDU, which indicates that the MAC PDU is correctly transmitted, send the next MAC PDU to the MAC entity of the receiving device; or
wherein the processor is further configured to: in response to determining that the expected receiving sequence number is not equal to the sending sequence number of the next MAC PDU, which indicates that the MAC PDU is incorrectly transmitted, retransmit the MAC PDU.

12. The sending device according to claim 11, wherein the processor is further configured to:
extract the MAC PDU from a buffer, and reschedule a transmission resource for the MAC PDU; and
in response to the rescheduled transmission resource meeting a condition of transmitting the MAC PDU at a time, retransmit the MAC PDU to the MAC entity of the receiving device; or
in response to the rescheduled transmission resource not meeting the condition of transmitting the MAC PDU at the time, re-segment the MAC PDU before retransmission.

13. The sending device according to claim 10, wherein the processor is further configured to:
in response to an expected receiving sequence number returned by the MAC entity of the receiving device according to the MAC PDU not being received within a preset duration, enable the MAC entity of the sending device to enter a sleep state; and
in response to a preset sleep duration expiring, re-establish a connection to the MAC entity of the receiving device.

14. The sending device according to claim 10, wherein an initial sending sequence number value and an initial expected receiving sequence number value are equal, and both quantities of bits are 1.

15. The sending device according to claim 10, wherein the processor is further configured to: obtain a priority of the logical channel, and allocate a transmission resource to the MAC SDU according to the priority of the logical channel.

16. A receiving device, comprising a Media Access Control (MAC) entity, wherein the MAC entity of the receiving device comprises:
a receiver, configured to receive, by using a physical entity of a sending device and a physical entity of the receiving device, a Media Access Control protocol data unit (MAC PDU) sent by a MAC entity of the sending device;
a processor, configured to:
remove a MAC header from the MAC PDU received by the receiver, and reassemble the MAC PDU to generate a MAC data packet; and
demultiplex the MAC data packet to generate a Media Access Control service data unit (MAC SDU); and
a transmitter, configured to submit the MAC SDU to a Packet Data Convergence Protocol (PDCP) entity of the receiving device by using a logical channel,
wherein the processor is further configured to:
decode the MAC PDU received by the receiver;
determine whether a current expected receiving sequence number maintained by the MAC entity of the receiving device is equal to a sending sequence number of the MAC PDU received from the MAC entity of the sending device, wherein the current expected receiving sequence number indicates a current count of MAC PDUs received from the MAC entity of the sending device and maintained by the MAC entity of the receiving device, and wherein the sending sequence number indicates a count of MAC PDUs sent and maintained by the MAC entity of the sending device; and in response to a determining result that the current expected receiving sequence number is equal to the sending sequence number of the MAC PDU received from the MAC entity of the sending device, which indicates that the MAC PDU is not a repeated data packet, return an expected receiving sequence number obtained by increasing the current expected receiving sequence number by 1 to the MAC entity of the sending device.

17. The receiving device according to claim 16, wherein the processor is further configured to:

in response to a determining result that the current expected receiving sequence number is not equal to the sending sequence number of the MAC PDU, and when compared with a stored sending sequence number that is received last time, the sending sequence number of the MAC PDU is not flipped but is expected to be flipped, which indicates that the MAC PDU is a repeated data packet, keep the current receiving sequence number unchanged, and return the current receiving sequence number to the MAC entity of the sending device; or in response to a determining result that the current expected receiving sequence number is not equal to the sending sequence number of the MAC PDU, and when compared with a stored sending sequence number that is received last time, the sending sequence number of the MAC PDU is flipped but is not expected to be flipped, which indicates that a MAC PDU is lost, keep the current receiving sequence number unchanged, and return the current receiving sequence number to the MAC entity of the sending device; or in response to decoding failing, or a data packet sent by the MAC entity of the sending device not being received within preset duration, keep the current expected receiving sequence number unchanged, and return the current expected receiving sequence number to the MAC entity of the sending device.

18. The receiving device according to claim 16, wherein an initial sending sequence number value and an initial expected receiving sequence number value are equal, and both quantities of bits are 1.

* * * * *

UNITED STATES PATENT AND TRADEMARK OFFICE
CERTIFICATE OF CORRECTION

| | | |
|---|---|---|
| PATENT NO. | : 10,735,334 B2 | Page 1 of 1 |
| APPLICATION NO. | : 15/934503 | |
| DATED | : August 4, 2020 | |
| INVENTOR(S) | : Yu et al. | |

It is certified that error appears in the above-identified patent and that said Letters Patent is hereby corrected as shown below:

On the Title Page

Page 2, Item (56) Other Publications: "URL:https://en.wikipedia.org/w/ndex.php?" should read
-- URL:https://en.wikipedia.org/w/index.php? --.

Page 2, Item (56) Foreign Patent Documents: "IN 101715212 A" should be -- CN 101715212 A --.

In the Claims

Claim 17, Column 46, Line 16: "received within preset duration, keep the current" should read
-- received within a preset duration, keep the current --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*